US007343252B2

(12) United States Patent
Wiens

(10) Patent No.: US 7,343,252 B2
(45) Date of Patent: Mar. 11, 2008

(54) METHOD, SYSTEM AND APPARATUS FOR PASSIVELY MONITORING THE MAINTENANCE AND DISTRIBUTION OF FLUID PRODUCTS TO HEAVY WORK VEHICLES

(75) Inventor: Jack A. Wiens, San Jose, CA (US)

(73) Assignee: Scientronix Inc., San Jose, CA (US)

( * ) Notice: Subject to any disclaimer, the term of this patent is extended or adjusted under 35 U.S.C. 154(b) by 0 days.

(21) Appl. No.: 11/061,091

(22) Filed: Feb. 18, 2005

(65) Prior Publication Data

US 2005/0199312 A1 Sep. 15, 2005

Related U.S. Application Data

(63) Continuation-in-part of application No. 09/872,693, filed on Jun. 1, 2001, now abandoned.

(51) Int. Cl.
*G01F 17/00* (2006.01)

(52) U.S. Cl. ........................................................ 702/54

(58) Field of Classification Search .................. 702/54, 702/188; 235/381, 450; 700/231
See application file for complete search history.

(56) References Cited

U.S. PATENT DOCUMENTS

| | | | | |
|---|---|---|---|---|
| 3,634,657 | A | | 1/1972 | Ballard et al. |
| 3,651,312 | A | | 3/1972 | Barney |
| 3,788,617 | A | | 1/1974 | Barney |
| 3,995,145 | A | * | 11/1976 | Harris, III .................... 235/450 |
| 4,345,146 | A | * | 8/1982 | Story et al. ................. 235/381 |
| 5,552,987 | A | * | 9/1996 | Barger et al. ................. 701/14 |
| 5,823,295 | A | | 10/1998 | Griffith et al. |
| 5,913,180 | A | | 6/1999 | Ryan |
| RE36,510 | E | * | 1/2000 | Burns ......................... 700/231 |
| 6,047,250 | A | * | 4/2000 | Beaudoin et al. ........... 702/188 |
| 2003/0065570 | A1 | * | 4/2003 | Fukushima et al. ........... 705/22 |

* cited by examiner

*Primary Examiner*—John Barlow
*Assistant Examiner*—Xiuqin Sun
(74) *Attorney, Agent, or Firm*—Buchanan Ingersoll & Rooney LLP

(57) ABSTRACT

A method and apparatus for passively monitoring the distribution of fuel and lubrication fluids to track vehicles and other heavy duty work equipment, such as bulldozers, draglines, scrapers, loaders, etc. The system includes means for identifying and recording the identity of the dispensing vehicle, the dispensing operator, the location of the dispensing vehicle, the receiving vehicle, the receiving port on the receiving vehicle, the type of fluid dispensed, the quantity of fluid dispensed, and the time of the dispensing. The system also includes means for verifying that the proper fluid is dispensed to the appropriate port. Use of the system does not in any way interfere with the servicing operations.

12 Claims, 24 Drawing Sheets

METHOD, SYSTEM AND APPARATUS FOR PASSIVELY MONITORING THE MAINTENANCE AND DISTRIBUTION OF FLUID PRODUCTS TO HEAVY WORK VEHICLES

DESCRIPTION OF RELATED ART

This application is a Continuation-in-Part to my application of like title Ser. No. 09/872,693 filed Jun. 1, 2001 now abandoned.

FIELD OF THE INVENTION

The present invention relates generally to systems for monitoring the refueling and maintenance of heavy work equipment, and more particularly to a method, system and apparatus for passively monitoring the maintenance and distribution of fluid products to heavy work vehicles in the field.

BACKGROUND OF THE INVENTION

Due to the strenuous tasks and hostile environments in which work vehicles, normally referred to as "heavy equipment", are required to perform, and the fact that such vehicles are normally operated at work site locations remote from the garage or maintenance yard at which the equipment is based, fuels, cooling fluids and certain lubricating resources must be delivered to the work site in order to maintain the life span of the equipment. Equipment of the type often referred to as track vehicles, large rubber tired vehicles, and stationary generators, crushers, etc., may include machinery such as tractors, bulldozers, earthmovers, etc. These types of heavy equipment are normally serviced at the work site by product maintenance and resource vehicles called lube trucks.

Lube trucks typically include an assortment of tanks, pumps, hoses and attaching connections or fittings for dispensing materials, which may include fuel, oils, greases, water, etc. Further, the lube vehicles may include an assortment of tanks and hoses for collecting waste or reclaimable products. The tank sizes often range from 30 to 2000 gallons or more.

Frequently, a plurality of such vehicles are serviced by a single lube truck, and often two or more lube trucks service several pieces of heavy equipment located in the same general area. These operations often result in several people being associated with the lube vehicles servicing several mobile equipment vehicles during one visit to the vehicle work site location. Consequently, it is often difficult to determine whether or not the correct materials (e.g. fuels, oils, greases, water, etc.) are being dispensed in the proper quantities to the correct receptacles. Further, the environments associated with these situations often make it difficult to trace the distributor, as well as keep good records of the amounts of the distributions. It is in many cases also difficult for the personnel, operators, owners and management of the heavy equipment being serviced to identify and keep track of the location and identity number or designation of a particular piece of heavy equipment to which the fluids are dispensed. Although attempts have been made to provide solutions to the problems alluded to, such solutions have to date been ineffective and user unfriendly in that they are difficult or complicated to use. Such systems frequently place expensive and sometimes fragile electronic equipment in the hands of workers uninterested or inadequately trained in the use of such devices. As a consequence, the devices are not used, are misused or even lost or damaged with the result that the intended purpose is frustrated.

SUMMARY OF THE INVENTION

Accordingly, it is an object of the present invention to provide an improved method and system, and associated apparatus, for passively monitoring distribution of consumable products to heavy duty work equipment.

Another object of the present invention is to provide a product distribution monitoring system that decreases the record keeping burden on the operator of a supply vehicle.

A further object of the present invention to provide a means for alerting an operator of an impending incorrect product distribution.

Yet another object of the present invention is to provide a means for signaling an operator during distribution to validate and acknowledge correct product distribution to a particular one of a plurality of discrete fluid receiving reservoirs.

Still another object of the present invention is to provide identification of the vehicles, receptacle ports, fluids and functionary personnel associated with the product distribution.

Another object of the present invention is to provide a multi-component, fluids distribution monitoring system that can be retrofit to an existing fleet of work equipment and lube trucks without requiring material modification of the fleet vehicles or fluids plumbing and supply systems.

Briefly, a preferred embodiment of the present invention includes a method and apparatus for passively monitoring the distribution of fuel and lubrication fluids to heavy work equipment vehicles or stationary equipment such as bulldozers, draglines, scrapers, loaders, etc. The system includes means for identifying and recording the identity of the dispensing vehicle, the dispensing operator, the location of the dispensing vehicle, the receiving vehicle, the receiving port on the receiving vehicle, the type of fluid dispensed, the quantity of fluid dispensed, and the time of the dispensing. The system also includes means for verifying that the proper fluid is being dispensed to a particular port. Use of the system does not require substantial modification of existing distribution equipment or interfere with normal servicing operations.

An advantage of the present invention is that it provides a system for passively monitoring the dispensing activity of a fluids servicing vehicle as it replenishes heavy work equipment fluids reservoirs and delivers lubricants to specified required points.

Another advantage of the present invention is that it provides a system for assisting the operator of a servicing vehicle with records keeping.

Still another advantage of the present invention is that it provides a means for instantaneously verifying that the port to which a particular fluid is applied is that intended.

A further advantage of the present invention is that it provides substantially all of the records keeping input required for efficient operation of a product distribution system without increasing the operator workload or interfering with the normal conduct of the dispensing operation.

These and other objects and advantages of the present invention will become apparent to those skilled in the art upon review of the following specification, the accompanying drawings and the appended claims.

BRIEF DESCRIPTION OF THE DRAWINGS

FIGS. 52-62 are simplified drawings, diagrams and screen shots depicting use of the system in accordance with the present invention.

EMBODIMENTS FOR CARRYING OUT THE INVENTION

Figure 1:
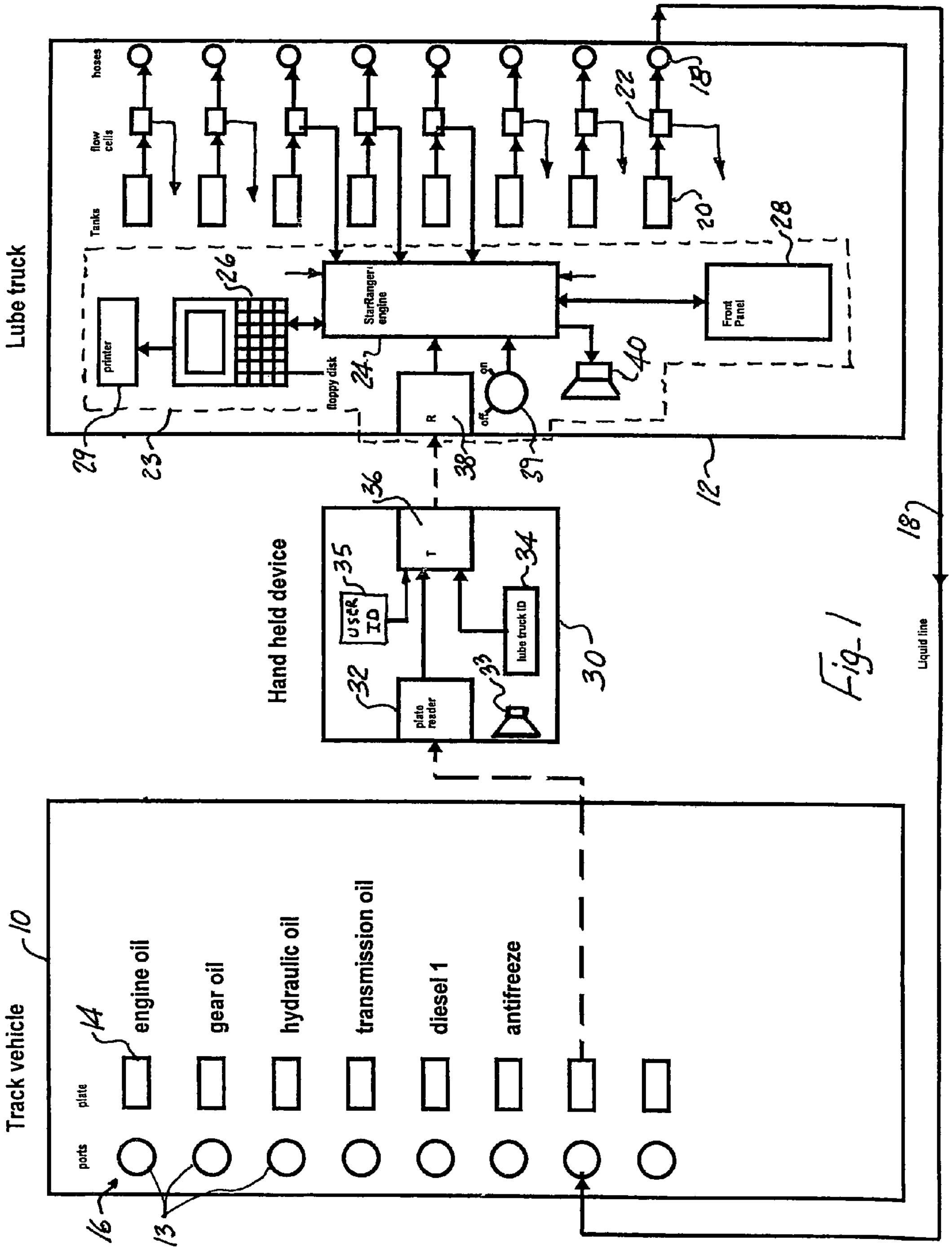
FIG. 1 is a generalized diagram schematically illustrating the basic components of an embodiment of the present invention as applied to a track vehicle or other mobile vehicle or stationary equipment, and a lube truck dispensing fluids thereto.

Referring now to the drawings, a simplified embodiment of a system for passively monitoring the maintenance and distribution of fluid products to heavy work vehicles in accordance with the present invention is illustrated schematically in FIG. 1. In this figure, a generalized representation of some of the principal operative components included in a monitoring system carried on a "lube truck" are depicted along with a "hand held reader" and an array of "identifying plates" carried on a track vehicle to be serviced using a monitoring system in accordance with the present invention. Although "track vehicle" is used throughout this application to identify the serviced apparatus, the actual apparatus may be any type of heavy mobile or stationary equipment normally serviced by a lube truck.

The track vehicle 10 is shown to include a plurality of fittings or ports 13, in some cases arranged in an array or group 16, for receiving fuel, lubricating oils, coolants or other fluid products from the lube truck 12. In accordance with the present invention, an ID plate 14 is affixed to the vehicle 10 proximate a corresponding port and is encoded. As will be further explained below, each ID plate 14 will carry an electromagnetically readable code identifying at least the carrying track vehicle, the associated port, and the type of fluid to be dispensed into the associated port. The lube truck 12 includes a plurality of hoses 18 that distribute the fluid products from corresponding tanks 20 that store each product. Flow cells 22 gauge the amounts of fluid product dispensed from each tank 20 to its associated hose 18, and ultimately to a particular port 13 in the track vehicle 10. The amounts of product that the flow cells 22 or other flow measurement devices measure as having been dispensed are normally accumulated and retained in counters and/or communicated to some type of onboard data collecting system. However, although the quantities of the fluids or other products distributed are measured, no means is usually provided to assure that the fluids were properly distributed to the proper vehicle, or to the proper port on a particular vehicle. It is this deficiency in the prior art that is addressed by the present invention.

More specifically, in accordance with the present invention a passive monitoring system is provided which includes a programmable monitoring unit 23, a handheld sensor device 30, and a plurality of ID plates 14 mentioned above. The monitoring unit 23 may include a computer 24, which may be accessed by an operator through another computer, such as a laptop 26, or a front panel 28 with a keypad for allowing an operator to communicate with the computer, a printer 29, a receiver 38, an on/off switch 39, and a horn 40. The computer 24 is adapted to separately monitor the operation of each flow cell 22 and record the quantity of fluid passing therethrough from a tank 20 to a hose 18. Where a flow meter, or flow cell, does not exist on the lube truck, an appropriate flow measuring device may be installed at each hose line on the lube truck. Computer 24 also compares flow cell ID (which is associated with a particular tank, and therefore identifies the type of fluid supplied to a particular hose 18) to the type of fluid read from the ID plate associated with the port 13 to which the hose 18 is connected, and if the two do not match, the computer causes the horn 40 to sound, and a record of the incident including all inputs is preserved.

A handheld ID plate reader device 30 is provided for extracting information from each ID plate 14. Included in the handheld device 30 is at least an ID plate reader 32, a lube truck identifier 34, and an operator identifier 35, as well as a transmitter 36. The transmitter 36 sends information from the ID plate reader 32 and the lube truck identifier 34 to the receiver 38 included in the lube truck 12. The receiver 38, in turn, routes the information to the computer 24 in the lube truck 12. The computer 24 may communicate a signal to a horn 40, or some other type of annunciator that will emit a sound confirming or denying distribution of the correct product to a particular port 13 in the track vehicle 10. Alternatively, the hand held device may itself include a sound emitting device 33 for emitting a sound which can be matched or otherwise related to the lube truck signal. Note that since the subject apparatus is entirely passive and does not perform any control function, the operator may choose to ignore the alarm warning of distribution of a product to the wrong port, and continue to distribute the product despite the alarm warning. However, as will be discussed below, his error will be tracked and recorded and he may subsequently be called upon to explain his oversight or intentional non-compliance.

In the illustrated embodiment, the ID plates 14 may number from one to sixteen, enabling the monitoring of up to 16. products. Each ID plate includes at least a product identifier, a track vehicle identifier, and a port identifier. Preferably, the ID plate is comprised of metal with an array of magnet receiving apertures formed therein. As discussed below, particular combinations of magnets in the array apertures, as well as their respective polarities signify the ID numbers. This is to say that some of the apertures may have magnets embedded therein and some apertures may be without magnets. Furthermore, some of the magnets may be polarized opposite to others. In any event, the array in each ID plate is configured to present a readable code uniquely identifying at least the three items indicated above. The plate in which the apertures are formed may be of aluminum, steel, a suitable plastic, etc. Alternatively, the ID plate may include a barcode or some other form of identifier encoded to identify the three items listed above. In this embodiment, the plate covers several square inches and is less than 0.25 . inches thick. Further, one of the several plates may be utilized to identify a port at which engine run hours may be read.

In the illustrated embodiment, the computer may utilize StarRanger ViewPro software of the type manufactured by Scientronix, Inc. of San Jose, Calif.

One or more hand held reader devices may be associated with each lube vehicle. Preferably, there are two reader devices, one for the operator of the lube vehicle and one for the journeyman. In this embodiment, both the operator and the journeyman would be assigned a personal reader device preprogrammed to output, in addition to the read ID plate information, a lube truck identifying code and a user identifying code. In use, the hand held device is held against the particular ID plate, thereby extracting the identifiers encoded on the track vehicle plate. The data is then transmitted to the receiver on the lube truck unit along with the operator/journeyman ID.

Figure 2:
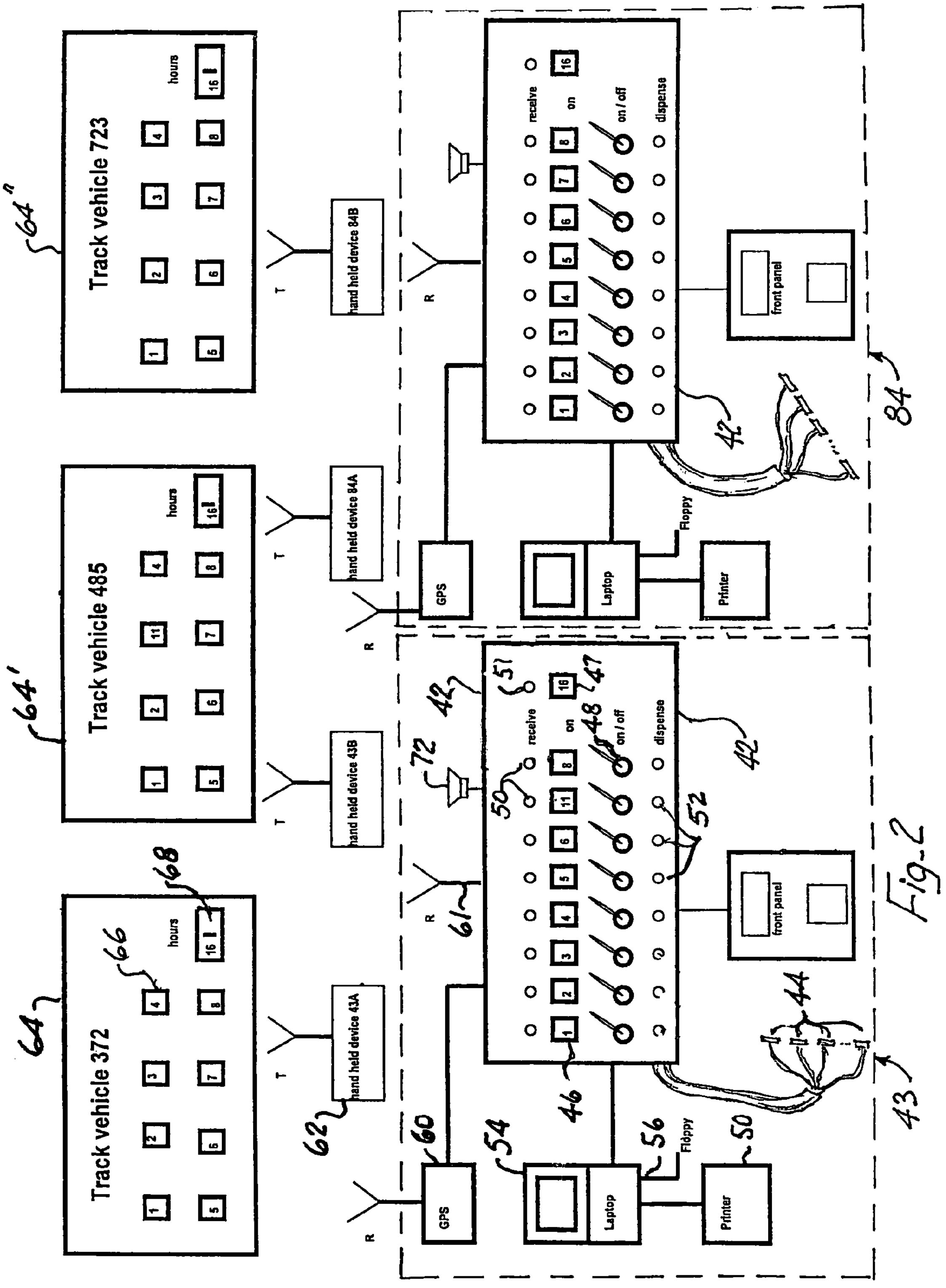
FIG. 2 is a generalized schematic illustration representing use of an alternative embodiment similar to that of FIG. 1 in association with multiple lube trucks and track or other mobile vehicles or stationary equipment.

FIG. 2 is a schematic illustration showing multiple lube truck units 42 replenishing multiple track vehicles 64 located in, for example, a storage yard or a marshalling area at a larger job site. Two lube trucks, each of which has a unique ID, are suggested by the dashed boxes 43 and 84. Although not shown, each lube truck includes storage tanks, pumps, flow metering devices, and hoses similar to that depicted in FIG. 1. In addition, the trucks may include fluid collection tanks and associated plumbing and housing (also not shown) to allow recoverable materials such as spent oils, coolants, etc., to be collected and returned for recycling or environmentally safe disposal.

In this embodiment, the housings for the units 42 include suitable cabling including a bundle of flow signal carrying lines leading to a plurality of jacks or sensors (for connection to the respective flow control and measurement devices on the carrying lube truck) for extracting flow information relating to each supply and/or collection hose. The housing face may include a plurality of hose line identifiers, or indicators, 46 a corresponding plurality of on/off switches 48 for selectively activating and disabling (turning off) each flow signal line, an upper row of indicators 50, each corresponding to one of the hose identifiers 46 and operative when illuminated to indicate that the corresponding hose is receiving (accepting) fluids, and a similar lower row of indicators 52, each corresponding to and associated with one of the hose lines to indicate that its corresponding hose is dispensing fluid. One of the indicators 46, designated 47 in FIG. 2, may be a non-dispense/collection indicator and provides an output indicating the engine run time of a track vehicle being serviced. Its associated indicator light 51 merely indicates that the engine run time sensor is active.

Each lube truck unit 42 also includes a front panel 52 for allowing the entry of information, a laptop 54 unit including a floppy disk drive 56 and a printer 58, and a global positioning system (GPS) 60 for generating and inputting a location signal. The GPS signal indicates the position of the vehicle, as well as the time associated with a dispensation at that position. Each unit 42 is equipped with at least one handheld device 62 for use by the operators of the carrying lube truck. Each hand held device 62 includes means for entering an ID identifying the operator and/or journeyman as pointed out above. One or more lube trucks may service multiple track vehicles 64.

As also discussed above, the track vehicles 64 include ID plates 66 encoded to identify and provide information about the track vehicle and the particular port being addressed by the lube truck operator. At least one identifier plate 68 on the track vehicle includes means for indicating engine run time hours and thus is not necessarily associated with a fill or collection port.

The identifier plates on each track vehicle may be color coded. Similarly, the nozzle on the pump on each hose from the lube truck may be color coded to correspond to the identifier plate affixed next to a corresponding fill port. This type of color-coding system may assist the operator in connecting the correct hose to the correct port by matching the nozzle color to the color of the identifier plate on the track vehicle. Any such matching system may help to ease the operator's task.

Figure 3:
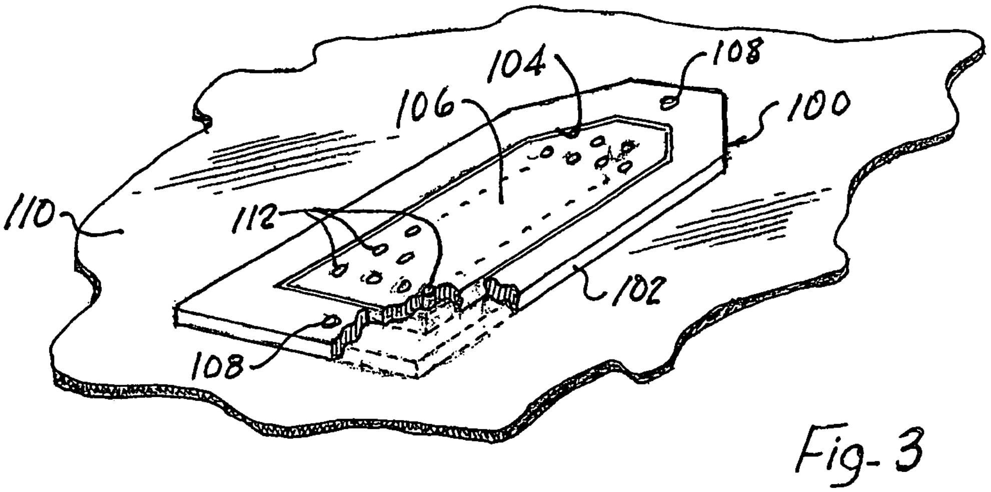
FIG. 3 is a broken perspective view illustrating a simplified ID plate in accordance with the present invention.

FIG. 3 is a broken perspective view showing a simplified embodiment of an ID plate in accordance with the present invention. As illustrated, plate 100 is actually an assembly including an outer frame 102 having a six-sided aperture 104 provided therein for receiving a six-sided code plate 106. Frame 102 may be of metal, plastic, or any other suitable material and may be provided with a pair of screw or rivet holes 108 for use in affixing it to a flat panel 110 of a track vehicle. The outer perimeter is made six-sided to facilitate proper alignment with a reader device. It is of course to be understood that any other suitable perimeter design could be used.

Code plate 106 is likewise configured to have an outer perimeter corresponding to the shape of aperture 104 so that when the code plate is installed in the frame 102, it too will be properly aligned. The code plate 106 may be retained within the frame 102 using any suitable mechanical or adhesive fastening means. A suitable adhesive coating applied to the back surface is the preferred fastener.

Plate 106 is provided with an array of cylindrical openings 112 for receiving a plurality of cylindrical magnets that when appropriately positioned and/or oriented (polarized), in predetermined areas of the plate, they will collectively evidence codes that identify (1) the track vehicle, and (2) the port to which the ID plate is associated. The type of material or product that is to be introduced into or removed from the reservoir linked to the port is identified in a data table associated with the port. Alternatively, the position of the magnets may evidence codes that identify the material or product that is to be introduced into or removed from the reservoir linked to the port. The magnets may be any shape suitable for use with the present invention. For magnet and plate material details of a similarly coded device, reference is made to the U.S. Pat. No. 3,995,145 of Harris, III, the entire disclosure of which is expressly incorporated herein by reference.

Any other method of coding the ID plate may be utilized that is suitable for use with the present invention. For example, the code may be electromagnetically coupled into a magnetizable strip or strips contained in or affixed to the ID plate. Similarly, a bar code or the like may be utilized.

Figure 4:
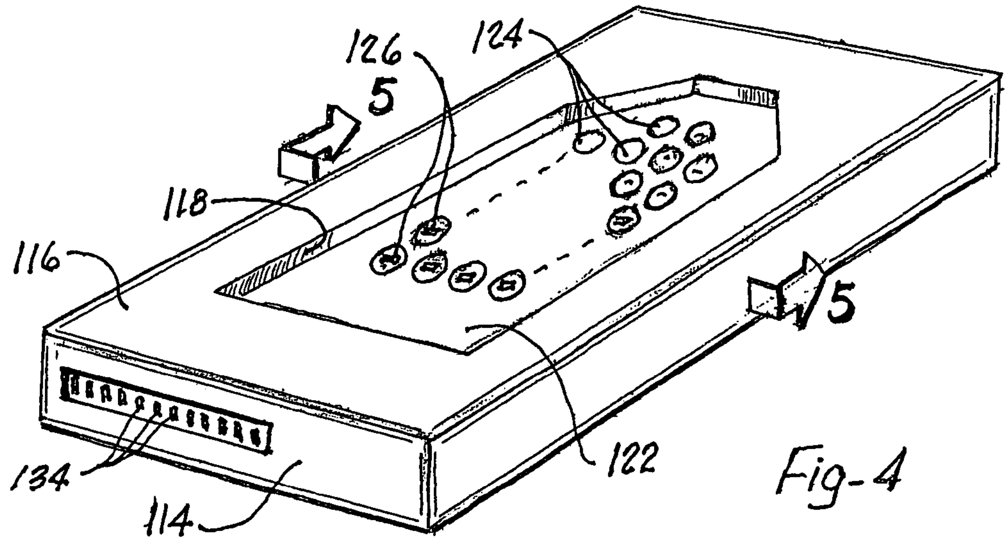
FIG. 4 is a perspective view showing a hand held ID plate reader in accordance with the present invention.
Figure 5:
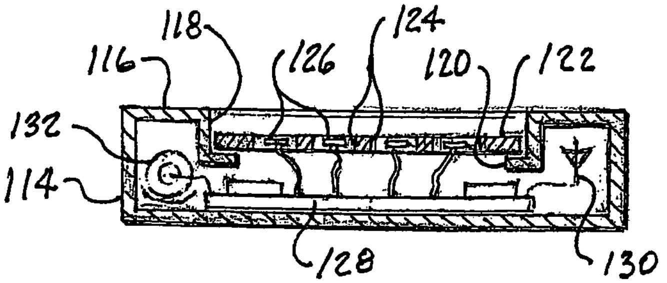
FIG. 5 is a transverse cross section taken through the plane 5-5 in FIG. 4.

Turning now to FIG. 4, a code reader in accordance with the present invention is depicted at 114 with its bottom side 116 facing upwardly. The reader 114 is essentially a rectangular or other suitably shaped container for housing reading and transmitting electronics components and includes a six-sided opening 118 for mating with the ID frame 102 shown in FIG. 3. As is shown more clearly in FIG. 5, which is a transverse cross sectional view taken through reader 114 in the plane 5-5 of FIG. 4, the opening 118 terminates in inwardly extending flanges 120 disposed within the volume of space defined by the container walls and forms a seat for a reader plate 122.

Reader plate 122 is formed of any suitable plastic or metallic material and has an array of openings 124 formed therein with the centers of the openings being substantially aligned with the center-lines of the magnets 112 of ID plate 106. The diameters of the openings 124 are however somewhat larger than the diameters of their magnetic cylinders so as to provide receptacles within which Hall-effect sensors or other magnetic field responsive devices 126 may be mounted. Positional within container 114 and beneath plate 122 is a circuit board 128 that carries electrical components capable of converting electrical outputs generated by the sensors 126 into the coded signals read from an ID plate, and for transmitting such signals via an antenna 130 back to the lube vehicle receiver. Power for the reader is supplied by batteries 132. However, any other charging source that is suitable for use with the present invention, such as a vibration charging mechanism, may be utilized to supply power to the reader. The lube truck ID and operator ID may be input to the electronics by means of micro-switches 134 that can be preset at the time it is assigned to the operator. The switches may be externally accessible as illustrated, or may be internal and inaccessible to the user of the device. Further, any other method of inputting coding to the electronics suitable for use with the present invention may be utilized.

In operation, an operator takes a dispensing hose or a receiving hose to a track vehicle. The operator connects the dispensing hose (or the receiving hose) to a port located on the track vehicle and positions his reader device over the corresponding identifier plate 66 on the track vehicle. In response, an ID signal is transmitted to the lube truck unit as the operator commences the fill or extraction operation. Transmission may be via radio waves, light (such as infrared), audio, or any other suitable means of communication. However, only the operator's lube truck will accept the transmitted signal from the hand held device 62. The horn 72 on the lube truck will sound to indicate that the dispensing hose or receiving hose is attached to the correct or incorrect port. If the hose is attached to an incorrect port, an alarm will sound and the product may or may not continue to be dispensed, depending on the conduct of the operator. In other words, since the present invention is passive and does not control operation of the lube truck servicing, the product may continue to be dispensed should the operator choose to ignore the alarm and leave the switch in the ON position. However, the truck unit 42 will record information associated with the transaction.

Figure 6:
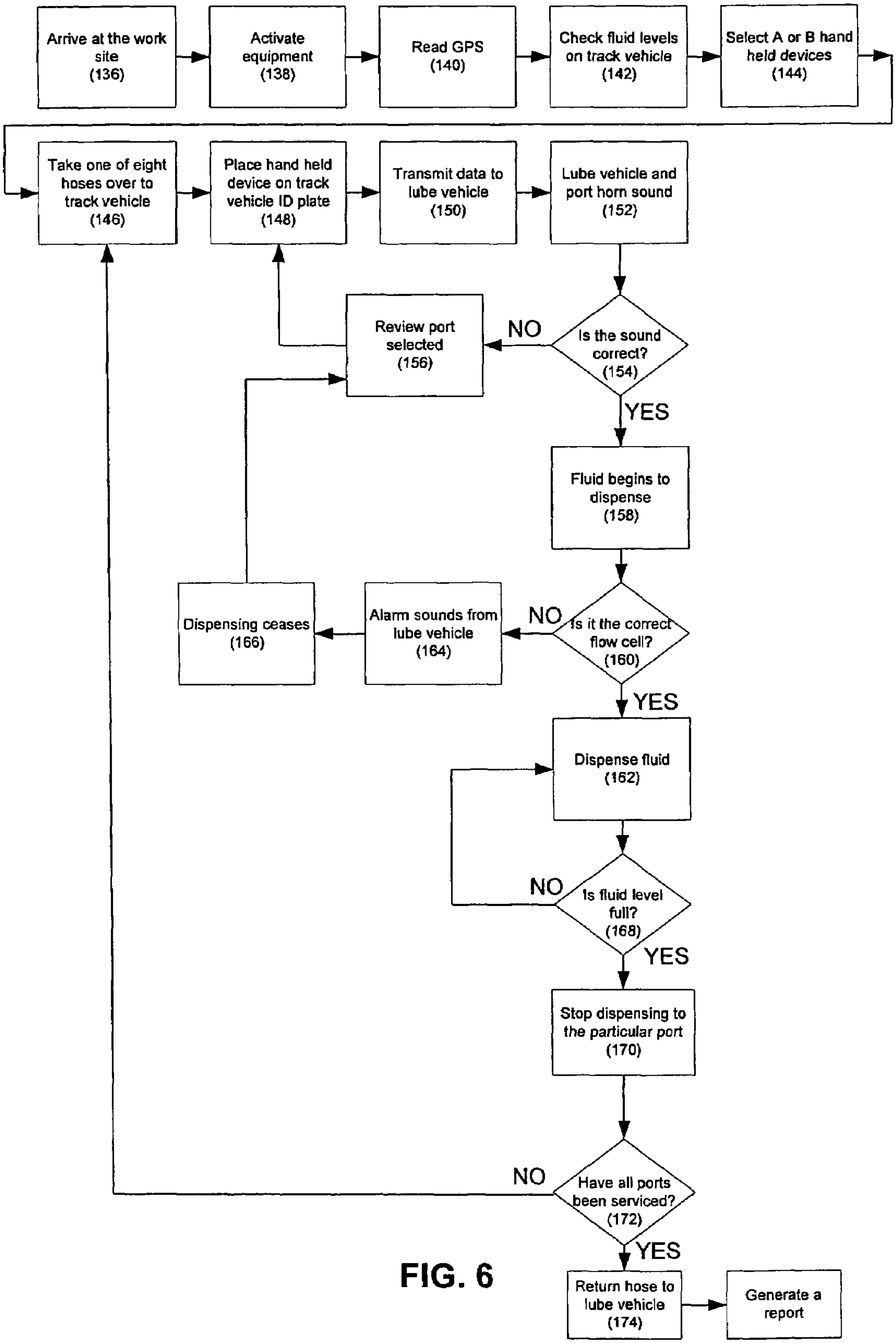
FIG. 6 is a flowchart illustrating a process for passively monitoring distribution of products in accordance with the present invention.
Figure 7:
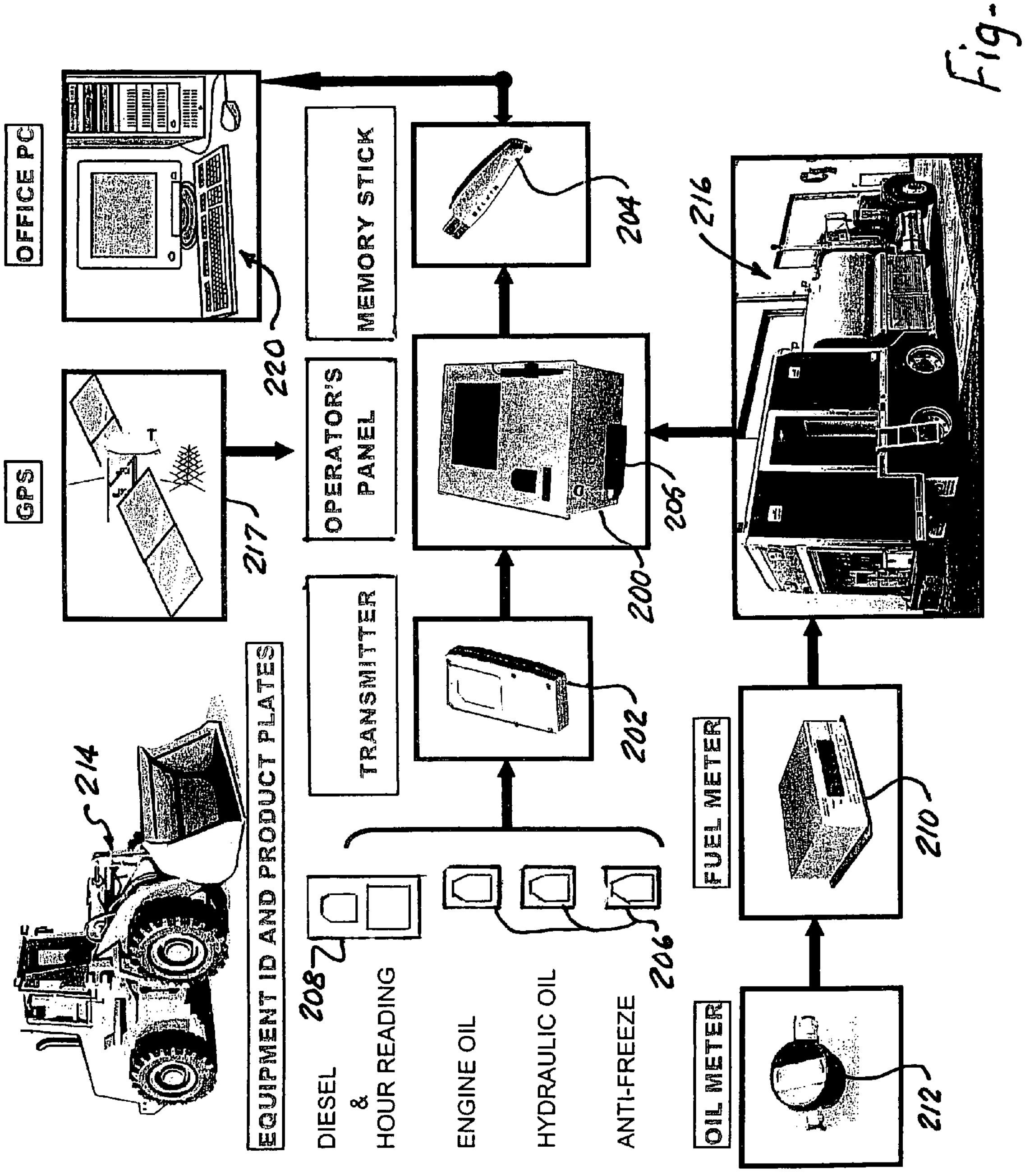
FIG. 7 is a diagram generally illustrating the principal components of the present invention and their relationship to a fleet of work vehicles.

FIG. 6 is a flowchart illustrating the process of delivering a product in accordance with an embodiment of the present invention. In this example, a lube vehicle operator and journeyman arrive at the work site (Block 136). The operator activates the subject monitoring system carried on the lube truck (Block 138). The position of the lube vehicle is automatically read from the GPS receiver output (Block 140). The operator checks the fluid levels on the track vehicle (Block 142) and selects one of the hand held devices on the lube vehicle (Block 144). The operator then takes one of the lube truck hoses over to the track vehicle (Block 146), connects the hose to a port, and places his hand held device on the ID plate located on the track vehicle next to the port (Block 148). The data from the ID plate, and that included in the hand held device itself is transmitted back to the lube vehicle (Block 150).

In this embodiment, the lube vehicle sounds a horn at a frequency corresponding to the particular hose (type product) being used, followed by a horn frequency corresponding to the product type intended to be provided to the particular port as identified by the track vehicle ID plate (Block 152). If both sounds match (Block 152), the operator causes the fluid to be dispensed from the lube vehicle to the track vehicle port (Block 154). Alternatively, the hand held device may itself emit a sound which can be matched or otherwise related to the lube truck signal. The signal may have the same frequency as the signal emitted from the lube vehicle, and further, the signal may be specific to the particular port. If the sounds do not match (Block 152), the operator then inspects the port selected (Block 156) and again places his hand held device on the ID plate located next to the port (Block 148). The operator may choose the same port or a different port, depending on whether he believes he initially made a mistake or that the system experienced a transmission error. The information will be retransmitted when the hand held device is reapplied to the plate and the process is repeated (Blocks 148, 150, and 152).

Once the fluid begins to dispense (Block 158), the system checks to see if it is being dispensed from the correct flow cell (Block 160). If the fluid is being dispensed from the correct flow cell, the fluid continues to be dispensed (Block 162). If the fluid is not being dispensed from the correct flow cell, an alarm sounds from the lube vehicle (Block 164) and the operator may cause the dispensing of the fluid from the flow cell to cease (Block 166). The operator can then again inspect the port selected (Block 156) and connect the hose to a different port, if appropriate, until the system confirms a correct connection.

As fluid is dispensed, the system periodically determines whether or not the "full" fluid level has been reached (Block 168). If the full fluid level is reached, dispensing of the fluid to the port (Block 170) is stopped. If the full fluid level has not been reached, the operator will continue to dispense fluid (Block 162). The system may also determine whether or not all of the ports have been serviced (Block 172). When all the ports have been serviced, the hose is returned to the lube vehicle (Block 174). If the fluid level at a particular port is not full when the supply available from the currently used hose is exhausted, the operator will return the hose to the vehicle and, if available, use another hose dispensing the same fluid and continue the dispensing process (Block 162).

Once all of the fluid levels are full, the operator will return the hose to the lube vehicle, and a report may be generated. The report may include the track vehicle ID, port IDs, port fill amounts, "wrong port" alarm, lube vehicle ID, operator ID, site location, run time hours, the date, and start and stop times. The operator can review the report, and if the readings on the report are good, the operator can turn off, or deactivate, the equipment. If the report includes bad readings, or print errors, the operator can make notes that reflect these errors. A floppy disk, memory stick, radio or telephonic transmission, or any other suitable means, may be utilized to transfer the data to an enterprise system at another location.

Each lube truck dispense port may be assigned a separate level in the software program. Since levels execute asynchronously, multiple products can be delivered at the same time. When the controller receives the start transaction digital signal, the level associated with that digital input will become active and save the analog values from the track vehicle in integer variables and real variables that are used only that level. A formula will add 0.5 . to round off each real variable that has to be treated as a whole number.

When the data from an ID plate on the track vehicle is transmitted from the hand held device to the lube truck, the receiver parses the data and attributes it to the appropriate port. The track vehicle information is stored in the controller.

When the operator finishes dispensing the product, an end of transaction signal is sent to the controller. A signal is sent to the computer to log the information stored in the controller for that particular port. The controller can keep running totals of the amounts of fluids delivered at each port.

Each product may be logged to a separate file. For example, if a lube truck includes eight dispenser ports, there may be eight files. Each record may represent a transaction, such as gas fill up, etc.

Referring now to FIGS. 7-16, a presently preferred embodiment of an actual embodiment of the method and system of the present invention is illustrated and includes an operator's panel 200, an operator's hand held reader/transmitter unit 202, a memory stick 204, a plurality of ID plates 206, a Diesel ID and Run Hour indicator 208, a Diesel fuel flow sensor 210, and a plurality of oil/gas flow meters 212.

Each hand held unit 202 is assigned to an operator by the office manager, and the assignment is registered in the system office database using a hexadecimal ID number that is permanently emblazoned on a plate affixed to the back of the hand held unit. The unit reads ID plates and run hours and automatically transmits the information to its associated lube truck operator panel when it is placed on an ID plate or run hour logger. The hand held unit is also used to obtain authorization for a dispense in the case that no ID plate is associated with a particular fill port. An operator ID plate can also be assigned to an equipment operator and used to identify the operator at a fueling station.

As will be further explained below, the ID plates 206 and run hour logger 208 are affixed to and carried on a piece of work equipment, such as the loader illustrated at 214, while the operator's panel 200 and meters 210 and 212 are carried on a lube truck such as that illustrated at 216. A GPS receiver (not shown) installed in the panel 200 provides wireless linkage to the GPS satellite system 217. Wireless communication of information obtained from the ID plates 206 and Run Hour indicator 208 using the hand held reader/transmitter unit 202 is communicated to an rf receiver (not shown) also contained within the panel 200, and communication of data between the panel 200 and the office PC 220 is accomplished by use of a memory stick 204 that is physically carried by the operator between the lube truck and system office.

The memory stick 204 is a commercially available solid state memory device used to transfer work orders from the office PC 220 to the lube trucks, and to return event logs from the lube trucks to the office PC. More specifically, the memory sticks 204 are used for bringing the entire fleet database (all lube trucks, work equipment, site locations, etc.) from the office computer to the operator panel of each lube truck at the beginning of the day, and for taking the dispense information back to the office computer at the end of the day. When any mobile component (panel 200) carrying the LubeRanger system software is operational, a memory stick 204 must be connected to a USB port (socket) 205 on the front side of the operator panel. In the system office, the memory stick 204 is inserted into a USB port containing receptacle on the office PC.

Figure 8:
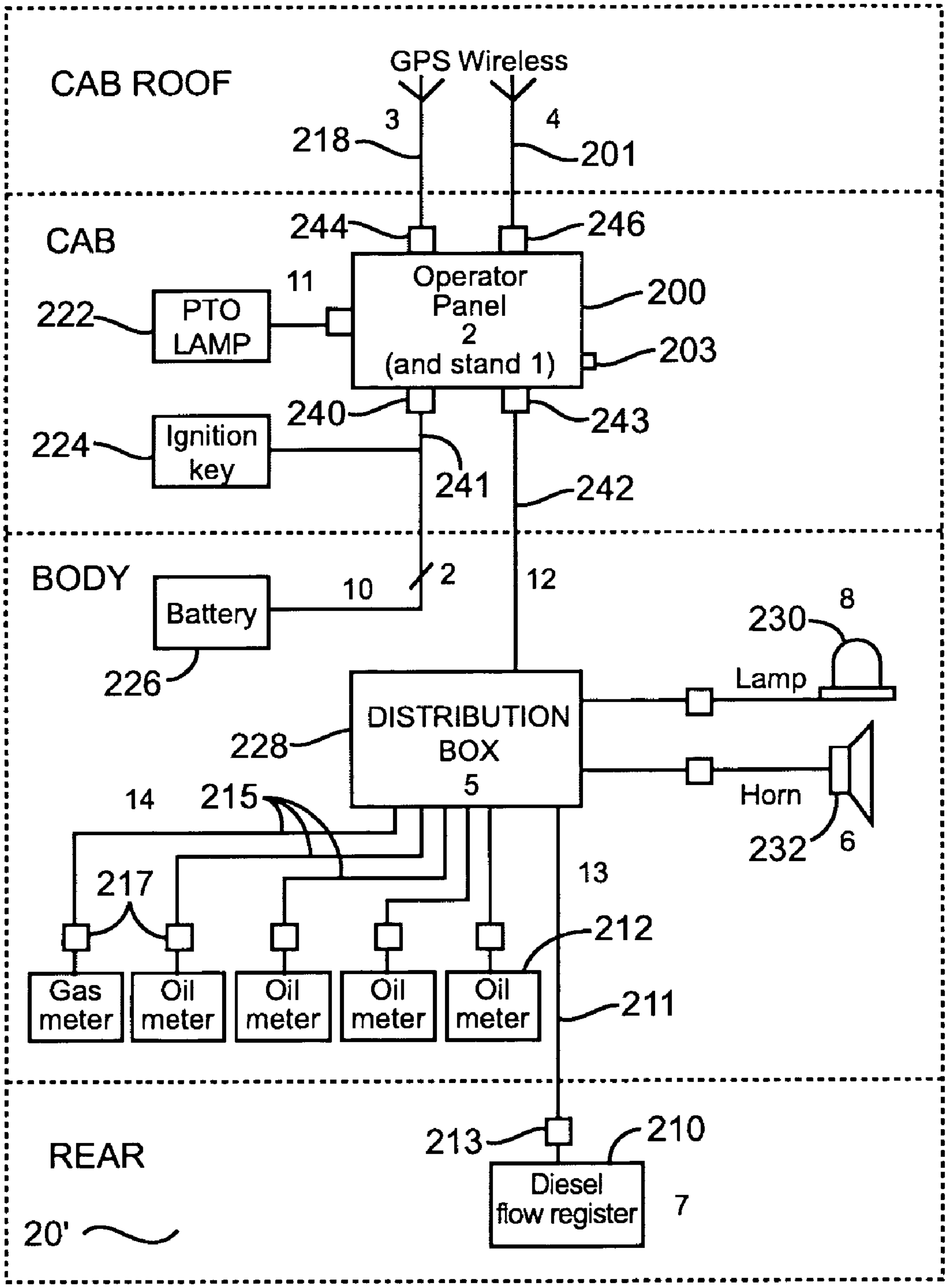
FIG. 8 is a block diagram schematically illustrating the positioning of various system components relative to a carrying lube truck.

In FIG. 8 a simplified schematic diagram is provided showing how and where on the lube truck the previously described components, as well as others, are carried. Specifically, the GPS antenna 218 and an rf antenna 201 for communicating with the hand held reader/transmitter unit 202 (FIG. 7) are typically mounted on the roof of the truck cab. The operator's panel 200 is mounted on a stand within the cab to be easily accessible by the operator. Attached to electrical terminals on panel 200 are a power take-off lamp 222 and an ignition switch connection 224 that opens and closes a power circuit connecting the panel and a battery 226 carried in the body of the truck. Outputs from the gas and oil sensors 212 carried in the truck body, and the Diesel flow register 210 positioned at the rear of the truck are coupled to the panel via a distribution box 228 that also couples annunciating output signals generated by the panel to a lamp 230 and a horn 232.

Figure 9:
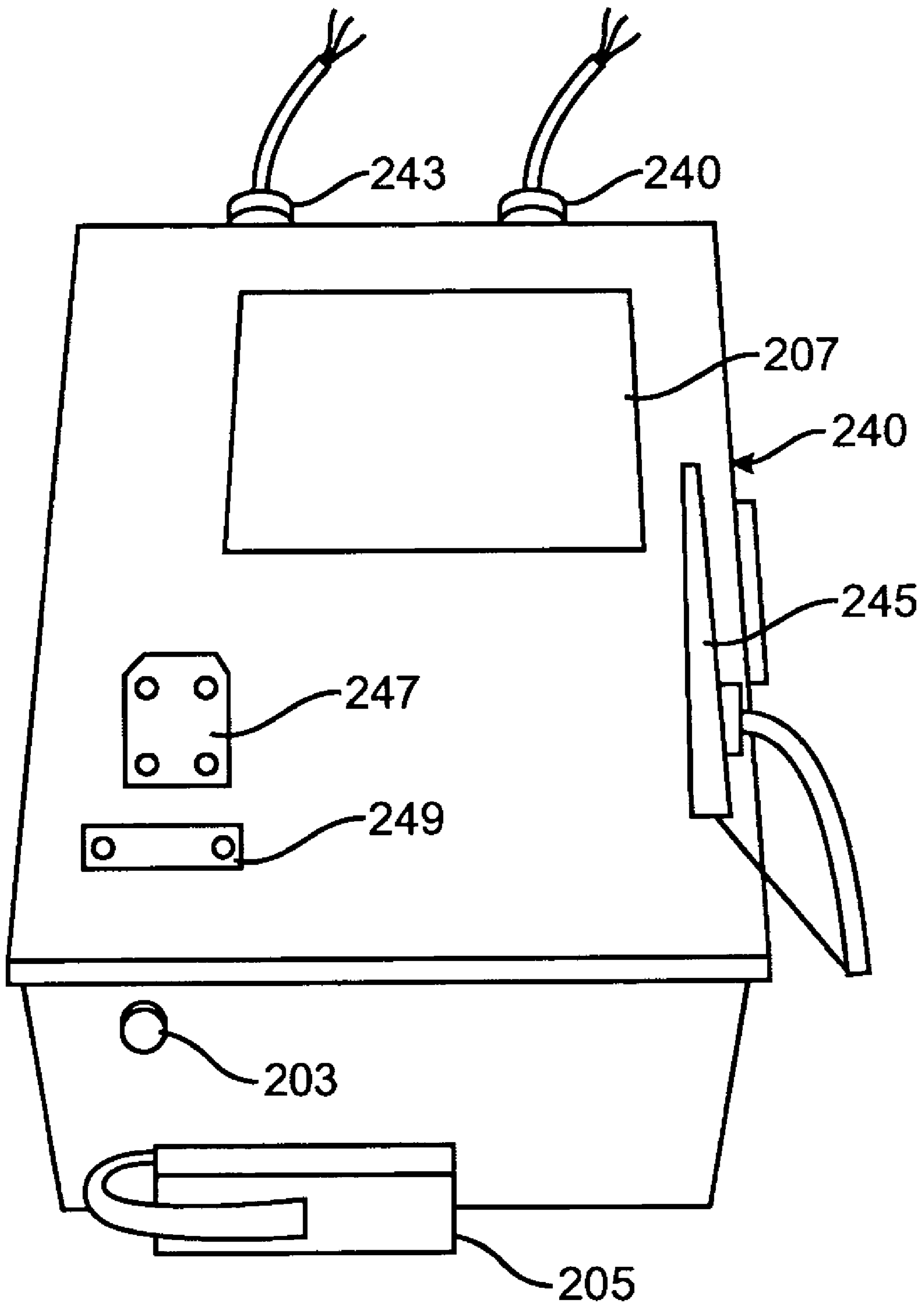
FIG. 9 is a drawing depicting an operator panel in accordance with the present invention.

An embodiment of the operator panel 200 is illustrated in FIG. 9 and includes a simple rectangular housing that is mounted in the lube truck cabin or at a fueling station. Contained within the housing are a microprocessor and associated electronic and mechanical communications and data processing components for receiving dispense requests from an operator's handheld unit 202 through a wireless channel, for receiving dispense signals from the meters 210 and 212 which measure the flow of dispensed liquids, for logging the dispense activities of the associated lube truck, and for providing a graphical user interface (GUI) for allowing an operator to communicate with the system. The GUI includes a controller contained within the housing and a touch screen 207 for enabling the operator to conveniently obtain work lists, information about dispensed amounts, equipment at sites, etc. Affixed to the front face of the panel 200 is a stylus 245 for use in inputting information to the touch screen 207. Also affixed to the front face is a panel ID plate similar to the ID Plates 206 (FIG. 7) and a wakeup signal transmitting plate 249 for communicating a wakeup signal to a hand held reader/transmitter 202 when it is placed in registration with the ID plate 247.

The operator panel 200 is mounted on a stand in the truck cab (not shown) to provide easy access to the operator as he carries out his duties. As depicted generally in FIG. 8, a connector 240 on the end of a cable 241 connects to a terminal on the back of the operator panel 200. The other end of the cable has three wires—ground, ignition and battery +12V. The ignition wire is connected to the auxiliary side of the ignition lock 224, while the ground and +12V wires are connected to the vehicle battery 226. An in-line fuse (not shown) is provided on the +12V line for safety. Another cable 242 extends between a second connector 243 on the back of the panel 200 and the distribution box 228.

The panel is electronically related to the associated truck by a serial number generated by an electrical identifying device called a "dongle" (not shown) that is electrically connected to the processor contained within the panel. The dongle number is entered into the system program in the office PC before the dongle is installed in the panel of a specific lube truck, and is recorded in an attached memory stick to identify the source of the lube event data carried thereby for report to the office PC. As indicated above, the panel also includes a commercially available GPS receiver (not shown) that receives data signals from the global positioning satellites via the antenna 218 and provides geographical coordinates identifying the position of the lube truck. A magnetic mounting plate (not shown) is typically used to mount the GPS antenna to the roof of the truck cab. An antenna cable connects the antenna to a third connector 244 on the back of the panel 200. The rf network antenna 201 is also mounted to the roof of the cab and is connected by another antenna cable to a fourth connector 246 provided on the back of the panel 200.

As pointed out above, the distribution box 228 acts as a junction box for the connection between the panel 200, the Diesel flow register 210 and fluid flow meters 212, as well as the flashing lamp 230 and horn 232 that are mounted on the top side of the truck. Strong magnets are normally used to mount the lamp and horn on top of the truck. As will be further discussed below, the horn and lamp are used to provide audio-visual feedback to the operator using the hand held unit.

A length of cable 211 having a connector 213 on its distal end extends from the distribution box 228 and connects to a short cable attached to the fuel register 210. Similarly, short cables 215 with end connectors 217 are used to couple the flow meters 212 to the distribution box. The flow register 210 is an electronic device that is mounted on top of the truck's fuel flow meter (not shown) and is a "smart" device that indicates and logs the flow of diesel fuel dispensed from the truck.

Figure 10:
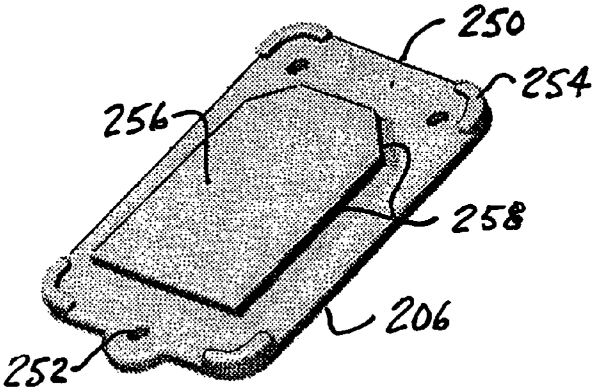
FIG. 10 is a drawing depicting an ID plate in accordance with the present invention.

As shown in FIG. 10, the ID plates 206 used to identify each fill port on a vehicle or tank to be serviced are similar to those previously described except that they are disposed within a molded housing that includes a backing plate 250 having three mounting holes 252 and means forming upstanding alignment shoulders 254 at each corner. The six sided, magnetically encoded signal plate 256 rises above the backing plate 250 so that its side edges cooperate with the shoulders 254 to properly align a hand held reader/transmitter unit when it is engaged thereto. Each plate is advantageously mounted near a vehicle fill port and carries a unique ID number assigned to that port.

Figure 11:
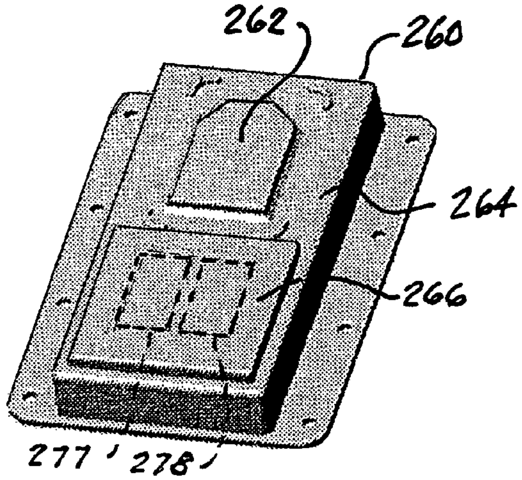
FIG. 11 is a drawing depicting a run hour logger/ID unit in accordance with the present invention.

The run hour logger/ID unit 260 shown in FIG. 11 is a device that is mounted on the work equipment to be serviced and serves two purposes; it identifies the Diesel fill port for that equipment and it counts the equipment's engine run hours. The first task is accomplished by a magnetically encoded signal plate 262 like that included in the ID plates of FIG. 10. The second task is accomplished by a vibration responsive measuring device that senses when the engine is running and records the elapsed time of its operation. The measuring device is contained within a rectangular housing 264 having a signal transferring pad 266 formed below the ID plate 262. As will be further explained below, the signal transferring pad 266 includes beneath its outer surface a pair of signal transferring capacitive plates as suggested by the dashed lines 277 and 278. The logger unit is affixed to the work equipment at a point near enough to the vehicle's engine that it can sense the vibration of the engine transmitted through the vehicle chassis as the engine runs.

Figure 12:
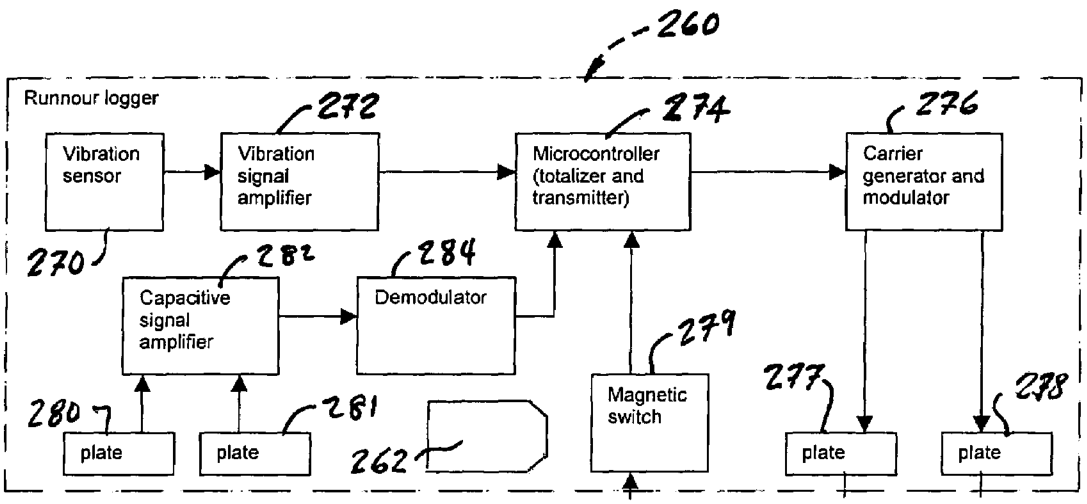
FIG. 12 is a block diagram schematically illustrating the principal operative components of a run hour logger circuit in accordance with the present invention.

A block diagram generally illustrating the internal components of the logger 260 is shown in FIG. 12. As depicted, the logger includes a vibration sensor 270, a vibration signal amplifier 272, a microcontroller 274, a carrier signal generator and modulator 276, and a pair of copper capacitive signal transferring plates 277 and 278. A magnetic switch 279 controls output of the run hour value accumulated by microcontroller 274.

The sensor 270 is typically a piezoelectric device that in the presence of vibratory motion, such as that caused by a running engine, is caused to flex and generate a small oscillating electrical signal. The frequency of the signal is determined by the resonance frequency of the mechanical self oscillation of the sensor. The small oscillating electrical signal generated by the sensor is then amplified by the amplifier 272 to an appropriate digital signal level for input to the microcontroller 274. The input digital signals define units of time ("time signals") that are registered by the controller as it uses a special algorithm to totalize the input time signals and generate a "run hour signal" that is proportional to the sum of the time signals generated during the time that the engine vibration is detected. The totalized or accumulated run hour value, in the form of a serial data signal, is then stored in flash memory in the microcontroller 274. Upon actuation of the magnetic reed switch 279, and as will be further explained below, the microcontroller 274 is caused to transmit the totalized run hour signal to the modulator 276 which in turn modulates its carrier frequency with the serial data signal output from the controller. The modulator output is then impressed upon the copper plates 277 and 278 thereby allowing the run hour value to be read and transmitted to the truck mounted operator panel 200.

Logger 260 also includes a second set of capacitive plates 280 and 281 upon which an externally generated signal value can be impressed, amplified by an amplifier 28, demodulated by a demodulator 284 and input to the controller 274 where it is used to preset, or reset, the engine run time value stored therein.

Figure 13:
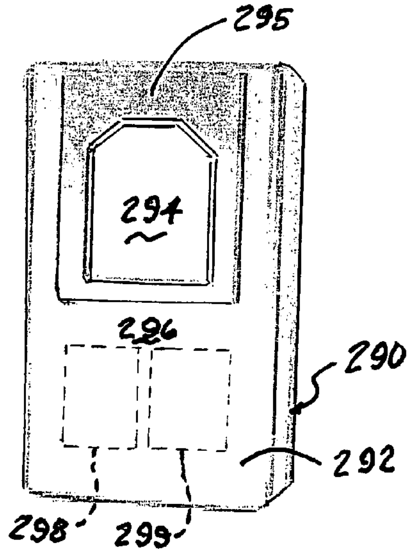
FIG. 13 is a drawing depicting a hand held ID plate/run hour logger reader/transmitter unit in accordance with the present invention.

In FIG. 13, an alternative configuration of the previously described hand held code reader/transmitter unit depicted above in FIG. 4 is shown at 290. As in the FIG. 4 embodiment, the unit 290 is shown with its bottom side 292 facing upwardly. The outer housing for unit 290 is essentially a rectangular or other suitably shaped container for housing magnetic data reading and transmitting electronic components, and includes a six-sided receptacle 294 formed in a raised rectangular surface 295 having corner edges for engaging the shoulders 254 as an ID signal plate 256 like that shown in FIG. 10 mates with receptacle 294. The housing for unit 290 is formed of any suitable plastic or metallic material and, like the previously described embodiment, has beneath its surface an array of Hall-effect sensors (not shown) or other magnetic field responsive devices for reading the negatively encoded ID plates 256. Note however, that in this embodiment the receptacle 294 is positioned toward one extremity of the unit leaving a plain surfaced area 296 at the other end. Positional beneath this plain area are a pair of signal receiving capacitor plates illustrated generally by the dashed lines 298 and 299. These plates are positioned so as to be aligned with the plates 277 and 278 of the logger 260 when the receptacle 294 is mated with the ID plate 262 (FIG. 11).

Figure 14:
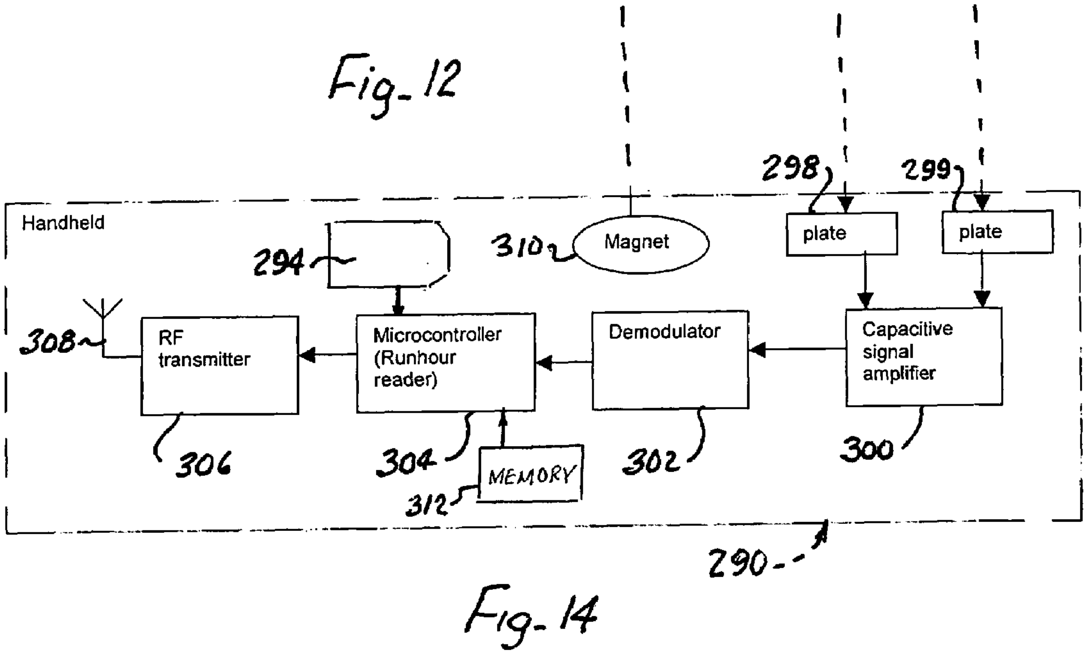
FIG. 14 is a block diagram schematically illustrating the principal operative components of the hand held ID plate/run hour logger reader/transmitter unit of FIG. 13.

In FIG. 14, a schematic block diagram is illustrated showing the electrical/electronic components of the hand held reader/transmitter unit 290 to include the pair of copper capacitor plates 298 and 299, a capacitive signal amplifier 300, a demodulator 302, a microcontroller 304, an rf transmitter 306 and an internal (or external) antenna 308. In this embodiment, a magnet 310 is provided and appropriately positioned to actuate the magnetic switch 279 in logger 260 when the receptacle 294 of the unit 290 is matingly engaged with an ID plate 262 (FIGS. 11 and 13) of a logger 260.

In addition to providing a control function for causing the logger 260 to output data including a run hour value, closure of switch 279 by the magnet of a hand held unit can also be used to cause microcontroller 274 to generate a wakeup signal in the form of an electronic impulse that can be communicated through the plates 277, 278 to the hand held unit and sensed thereby to cause it to wake up from its SLEEP state.

The hand held unit 290 also carries electrical components capable of converting electrical outputs generated by the array of sensors disposed beneath the receptacle 294 into the coded ID signals to be read from the ID plates 256 or 262, and for communicating such signals to the microprocessor 304, so that they too can be transmitted via transmitter 306 and antenna 308 back to the lube vehicle receiver in panel 200. Power for the unit 290 is supplied by batteries. However, any other charging source suitable for use with the present invention, such as a solar charger or vibration charging mechanism may be utilized to supply power to the reader/transmitter unit. The lube truck ID and/or operator ID may be also be input to the unit 290 and stored in electromagnetic memory 312 using well known signal transfer methods, or may be manually input to the unit via microswitches (not shown) that can be preset at the time the unit is assigned to the operator.

Figure 15:
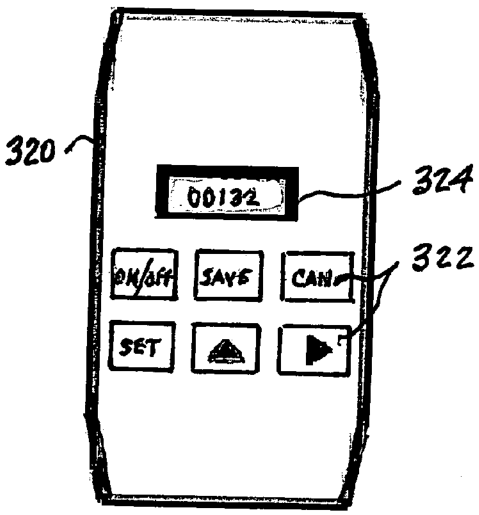
FIG. 15 is a drawing depicting a run hour programmer unit in accordance with the present invention.
Figure 16:
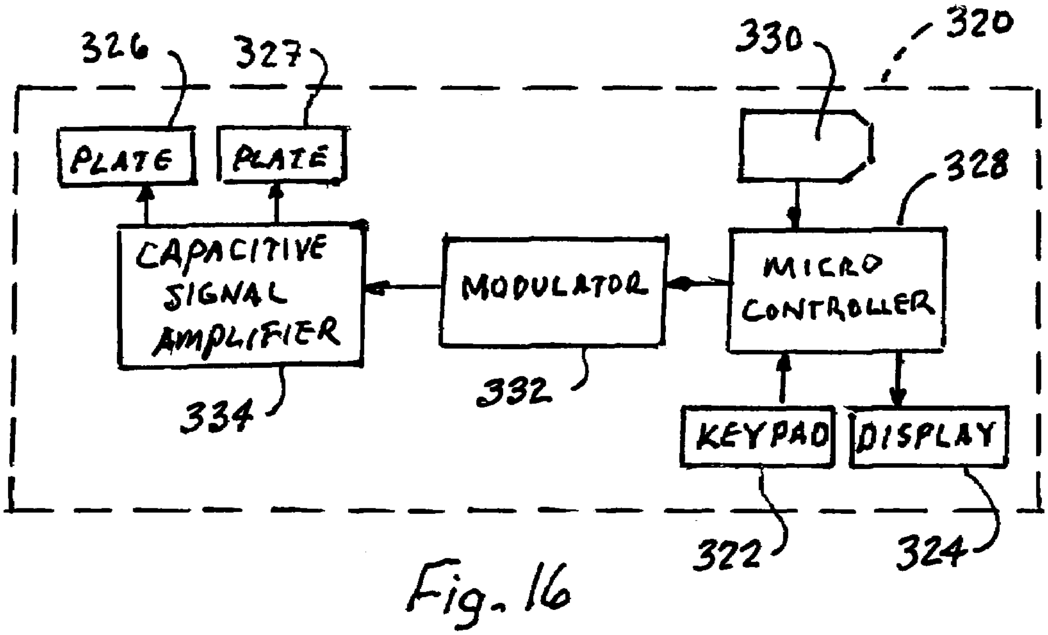
FIG. 16 is a block diagram schematically illustrating the principal operative components of the run hour programmer unit of FIG. 16.

Another portable unit that may be provided for the operator's use is shown generally at 320 in FIG. 15 and in the schematic block diagram of FIG. 16, is called a run hour programmer. This device is used to preset or reset the present run hour value of a run hour logger (FIG. 11). The programmer 320 is a hand held device that has input keys 322 and a display 324 for displaying ID-plate numbers and equipment run hour values on one side, and has means similar to that depicted in FIG. 13 provided on its opposite side for mating with the ID-plate 262, and capacitive plates 326 and 327 of a logger for capacitively communicating signals to the plates 280 and 281 thereof (FIGS. 11 and 12) to reset or preset the run time value. As suggested by the block diagram of FIG. 16, the programmer includes a microcontroller 328 for receiving logger ID signals from a magnetic reader component 330, and for presetting or resetting inputs from the keypad 322. In response, the microcontroller generates a confirming signal for readout on the digital display 324, and communicates the signal to a modulator 332 that appropriately modulates the signal for amplification by an amplifier 334 that impresses the signal onto the capacitive plates 326 and 327 for communication to the receiving capacitive plates 280 and 281 of a logger 260 (FIG. 11) to be set or reset.

In operation, the programmer 15 may be used for standalone reading of the ID plates and run hour loggers (i.e., without transmission back to the lube truck) as well as for presetting the run hour logger hour values. To set the run hours, the user will turn ON the programmer by pressing the ON/OFF key on the keypad 322, place programmer on the logger unit and wait for the acknowledgement beep. The beep indicates that the programmer has successfully read the logger unit's ID and current run hours. The logger unit's ID and the current run hour value are subsequently displayed on the programmer screen 324. The programmer is then removed from the logger unit, the 'Set' key is pressed and the run hours are set to the desired value using the arrow keys. To save the new run hour value, the programmer is placed back on the logger unit and the 'Save' key is pressed. The new run hours value will now be transferred to the logger unit. If the run hour setting was successful, the programmer will again beep and the new reading will be read from the logger unit and displayed on the screen 324.

The recommended hardware and software to be included in the data processing and control components of the system include:

Microsoft® Windows XP operating system
Microsoft® Access 2002 or later
LubePro™ software
Intel Pentium IV or Celeron 2,4 GHz or equivalent AMD Athlon or Duron processor,
512 MB RAM
USB 2.0

The present invention is implemented using LubePro™ software that is part of the LubeRanger™ mobile fluid dispensing management system for construction equipment sold by Scientronics, Inc. of San Jose, Calif. The LubePro™ application is created in Microsoft® Access and runs under the Microsoft® Windows operating system in the computer contained in the operator panel.

LubeRanger™ is an integrated hardware and software system for processing construction site work orders assigned to lube trucks. It tracks fluid dispenses and equipment relocation, creates reports and makes data available to the enterprise system.

The LubePro™ application stores information about sites, equipment, operators and lube trucks and has an intuitive user interface that makes it easy to enter and maintain the information in the data tables. The program also receives collected data from the lube trucks and provides many reports to help manage the fuel and other fluids delivery process. Daily, weekly and monthly client delivery reports and summaries are included in the package.

The "Backup" function uses 'Access Export' and creates all of the LubeRanger tables in comma delimited ASCII format. This data may be imported into any other compliant database. This provides a simple interface to an enterprise system.

The "Export" function also uses "Access Export" and creates only the Event Table in comma delimited ASCII format. This table may be stored on a network drive or anywhere convenient for accessing by other programs.

As previously described, the memory stick 204 is a commercially available solid state memory device that is used for physically transporting data between the lube trucks and the office computer (PC). The memory sticks are managed in the office using 3 "baskets". The first basket is the "IN" basket. At the end of each shift, the lube truck operators put the memory sticks with the daily lube events recorded therein into the "IN" basket. The equipment manager then takes the sticks from the "IN" basket, transfers the lube events data from all sticks into the office PC and puts the memory sticks in the "DONE" basket. After all of the sticks have been received and the data downloaded to the PC, the equipment manager creates new work orders, uploads the database to each of the memory sticks, and then puts the memory sticks in the "OUT" basket. At the start of the next shift, the lube truck operators take any one of the memory sticks from the "OUT" basket for insertion into their panel port.

The work orders define the sites and work equipment that each lube truck must service. Since all of the memory sticks are interchangeable and contain the same information, each lube truck operator will gain access to his work order as soon as he attaches a memory stick to the appropriate port on his operator panel. He is then in a position to commence his work day. During the shift, information about dispenses and other lube truck actions are automatically transmitted to and written into the stick in the lube truck. At the end of the shift, the stick is unplugged from the lube truck operator panel and carried back to the office and placed in the "IN" basket. The equipment manager must receive the data from all of the sticks and load it into the office computer database each day so that he can update the database and generate new work orders for transfer to the sticks.

The equipment manager specifies and manages equipment, fluids, sites, lube trucks, and operators. He also adds new equipment, fluids, sites, lube trucks, and operators into the database and creates daily work orders for each lube truck. The work orders contain a list of service sites to be serviced by each operator and lube truck. All work orders in the system are uploaded into each memory stick by individually connecting each memory stick to the USB port of the PC and sending the work orders to the stick. After the work orders are saved on the sticks, the sticks are placed into the "OUT" bin. The operators can then take any stick from the "OUT" bin and carry it to their lube truck.

Lube events are operations performed by the operators of the lube trucks during a particular shift. Lube events can be the dispense of fuels, oils or other fluids, or the collection of equipment run hours readings, controller start-up times, error messages, changes to ID plates, and data obtained from the ID plates by the hand held units, etc. The lube events input to each operator panel in each lube truck are written into the memory stick in that lube truck. Each event is logged and eventually received by the office database when the memory sticks are returned at the end of the shift.

Once the event data from all of the memory sticks is uploaded and the database is updated with the new events various reports can be produced.

Figure 17:
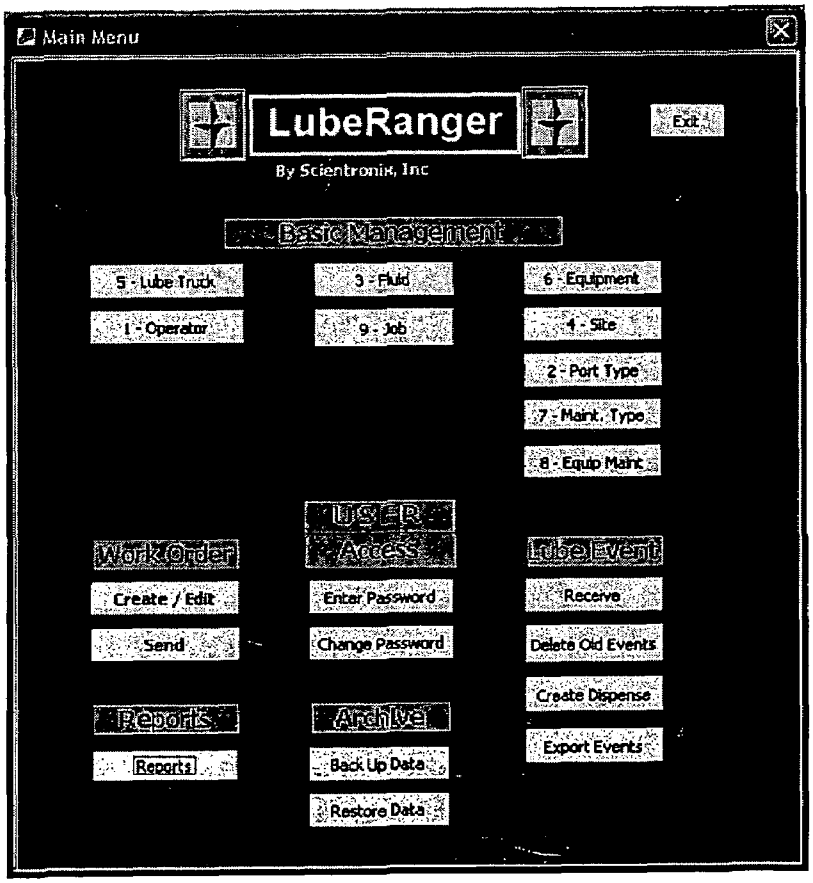
FIGS. 17-52 are screen shots depicting various user interface screens, windows and dialog boxes displayed during use of the present invention.

To start-up the LubeRanger, the manager double clicks on the LubeRanger icon on the desktop of the office PC and the "Main Menu" appears as illustrated in FIG. 17. Contained in the "Main Menu" is an array of windows or "buttons" allowing selective data entry in the following categories:

Basic Management

The Basic Management file contains the basic data of the system components. The "Basic Management" screen is a portal to a set of editing screens through which the equipment manager can maintain the LubeRanger data base. Data is entered in the order indicated by the numbers on the buttons.

1. Operator Window

The operator of the lube truck is the person who dispenses fluids, reads equipment run hours etc. The operator table consists of information relating to the lube truck operators and equipment operators. The equipment operator's ID must be entered if he fills his own equipment at a fueling station. In the case of equipment operators, the hand held ID field is used for the operator plate ID. Clicking on "1 Operator" in the "Main Menu" causes the "Operator List" illustrated as FIG. 18 to open.

Figure 19:
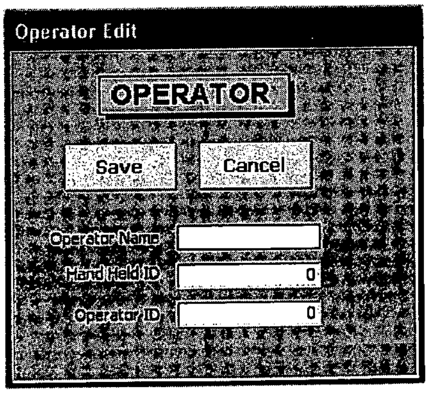

Clicking on "New" on the "Operator List" causes the "Operator Edit" form (FIG. 19) to open allowing input of the name of the operator; the hand held unit ID (each hand held unit is identified by a unique ID). And if a new equipment operator is added, the hand held ID field must contain his hand held unit ID. Operator ID is the operator's employee ID number. Following entry, the manager can click "Save" to store the data entered in the fields, or click "Cancel" to return to "Operator List" without saving.

Figure 18:
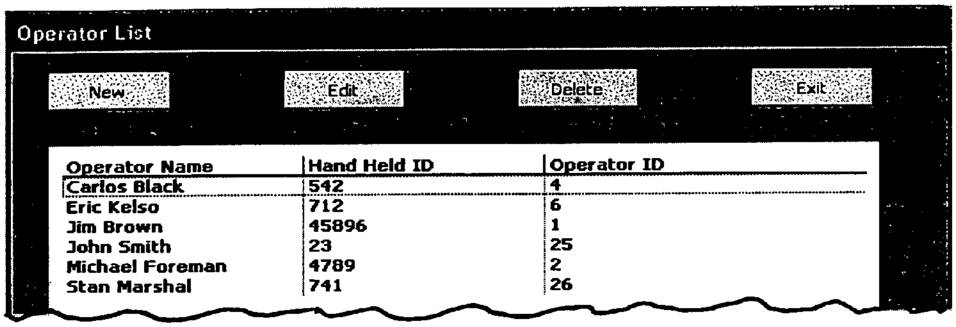

To change operators the manager will select the new operator's name on the 'Operator List' form (FIG. 18). He can then click "Edit" or double click on the selected Operator's name causing the "Operator Edit" form (FIG. 19) to re-open wherein he can change the hand held unit ID and/or the operator ID. Clicking "Save" causes the "Operator Edit" form to close and the screen to return to the 'Operator List' form (FIG. 18).

To delete an existing operator he can select the operator's name on the 'Operator List' form and click "Delete" to remove the selected Operator. Clicking on "Exit" on the "Operator List" form returns the "Main Menu" (FIG. 17) to the screen.

2. Port Type

The Port type is the name of a work equipment port. Every port on the equipment has a name and ID. The port type names and IDs remain the same for different equipment.

Figure 20:
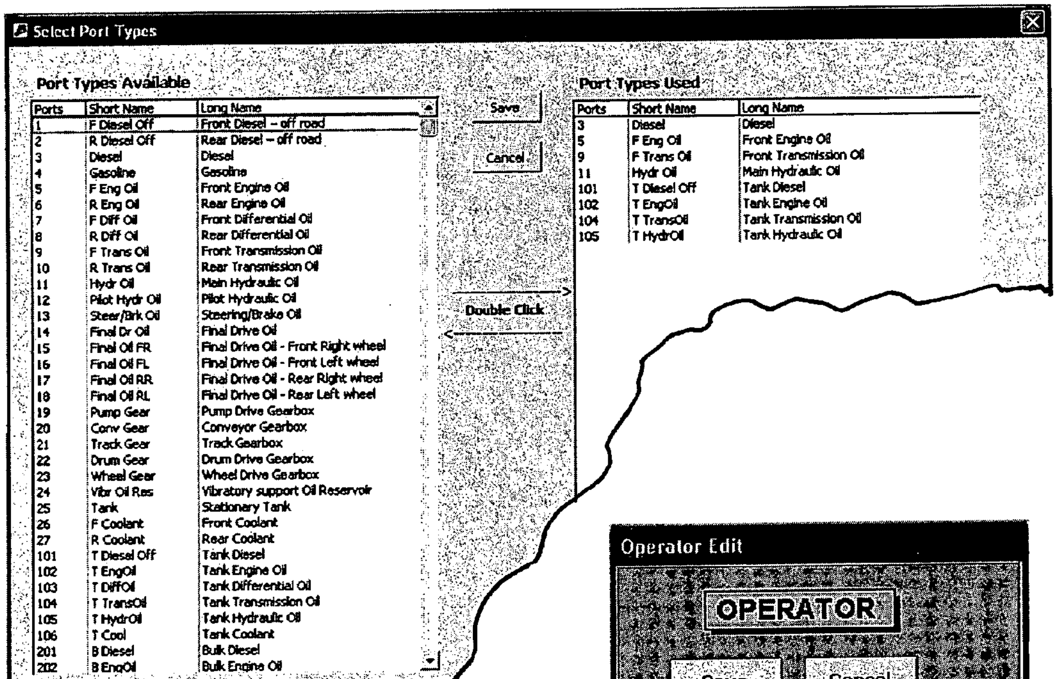

Clicking on "2. Port Type" on the "Main Menu" causes the "Port List" form (FIG. 20) to open.

Port numbers 1-100 are for equipment ports

Port numbers 101-200 are for Lube Truck Ports

Port numbers 201-300 are bulk fill ports.

To select a port type to use, the manager double-clicks on the port type in the left side list to move it into the right side list.

To deselect a port type, he double clicks it in the right side list to remove it from active use.

3. Fluid

A fluid can be fuel, oil, water or other liquid that is dispensed from lube truck to a work equipment.

Figure 21:
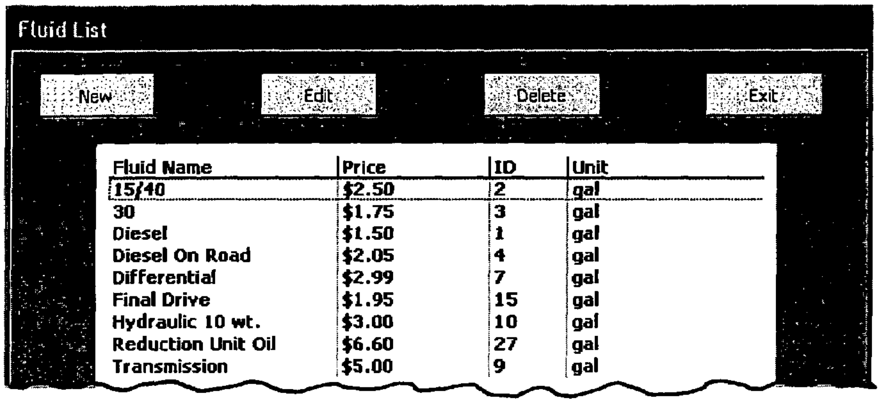

Clicking on "3. Fluids" on the "Main Menu" opens the "Fluid List" form (FIG. 21).

Figure 22:
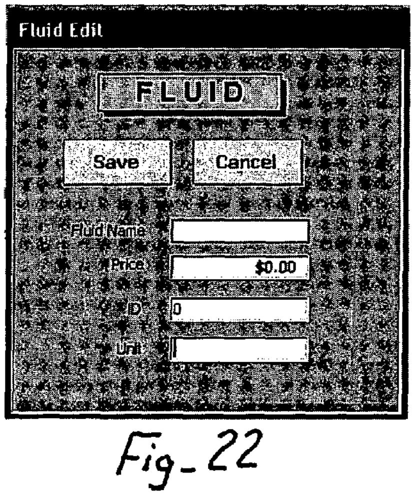

Clicking on "New" on the "Fluid List" form opens the "Fluid Edit" form (FIG. 22) so that information for the following fields on the "Fluid Edit" form can be entered:

Fluid name: The name of the fluid;

Price: The Price of the fluid;

ID: The Unique identifier of the fluid; and

Unit: The unit of measure.

Clicking "Save" stores the data in the fields and returns the screen to the "Fluid list" form. Clicking "Cancel" returns the screen to the "Fluid List" form without saving.

Selecting a fluid on the "Fluid List" form, or clicking "Edit" (or double clicking on the selected fluid) causes the "Fluid Edit" form to open. Upon changing the desired properties clicking "Save" closes the "Fluid Edit" form.

To delete a fluid one selects the fluid on the "Fluid List" form and clicks "Delete" to remove the selected fluid.

Clicking "Exit" on the "Fluid List" form returns the screen to the "Main Menu".

4. Site

A site is the place where the construction equipment is located and serviced.

Clicking on "4. Site" on the "Main Menu" causes the "Site List" form (FIG. 23) to open.

To add a new site, the longitude, latitude and site size should be known. One way to acquire site coordinates is to use a handheld GPS unit to acquire coordinate readings at the site center.

Note that the coordinate format and radius are specified as follows:

Longitude: xxxxx.xx where the first three digits are degrees followed by two digits of minutes and then two digits of seconds separated by point (.).

Latitude: xxxx.xx where first two digits are degrees followed by two digits of minutes and then two digits of seconds separated by point (.).

Figure 24:
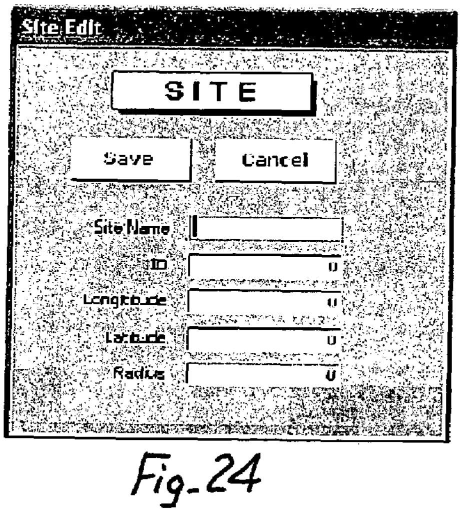

Clicking "New" on the "Site List" form opens the Site Edit" form (FIG. 24).

The following fields must be filled in on the "Site Edit" form:

Site Name: The name of the service site ID Unique identifier for the site;

Longitude: The GPS longitude coordinate of the site center;

Latitude: The GPS latitude coordinate of the site center; and

Radius: The radius of the site in miles.

Figure 23:
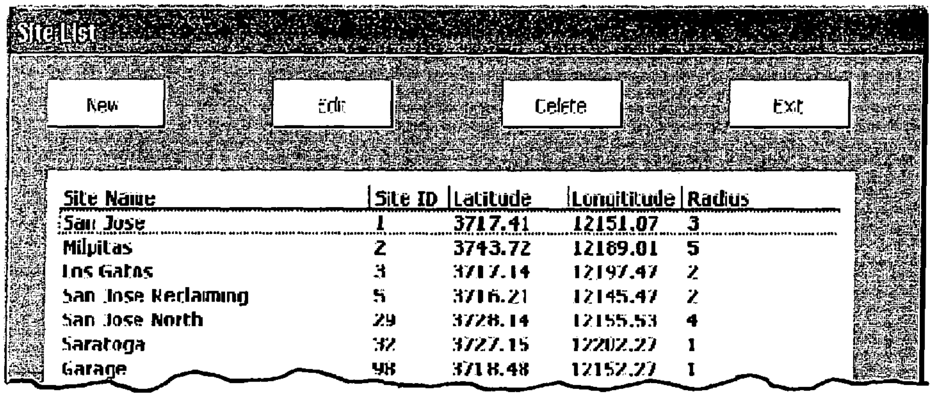

Clicking "Save" stores the data in the fields and returns to the "Site List" form. (FIG. 23).

Clicking "Cancel" returns to the "Site List" form without saving.

To change an existing site one select a site on the "Site List" form. (FIG. 23), clicks "Edit" or double clicks on the selected site to open the "Site Edit" form. (FIG. 24). He then change the desired properties and clicks "Save" and "Site Edit" to close the form To delete an existing site one selects the site on the 'Site List' form and clicks "Delete" to remove the selected site.

To exit to the Main Menu one clicks "Exit" on the "Site List" form.

5. Lube Truck

Lube Trucks carry and provide the fluids for the work equipment.

Figure 25:
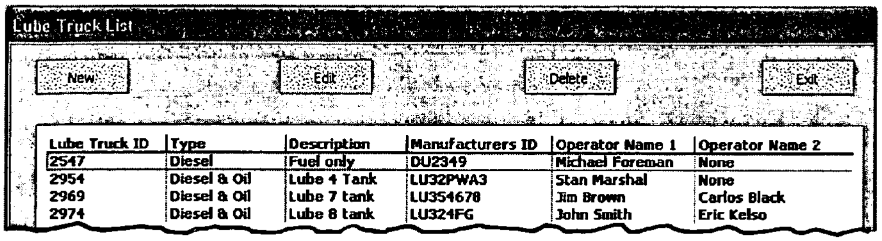

Clicking "5. Lube Truck" on the "Main Menu" causes the "Lube Truck List" form. (FIG. 25).

Figure 26:
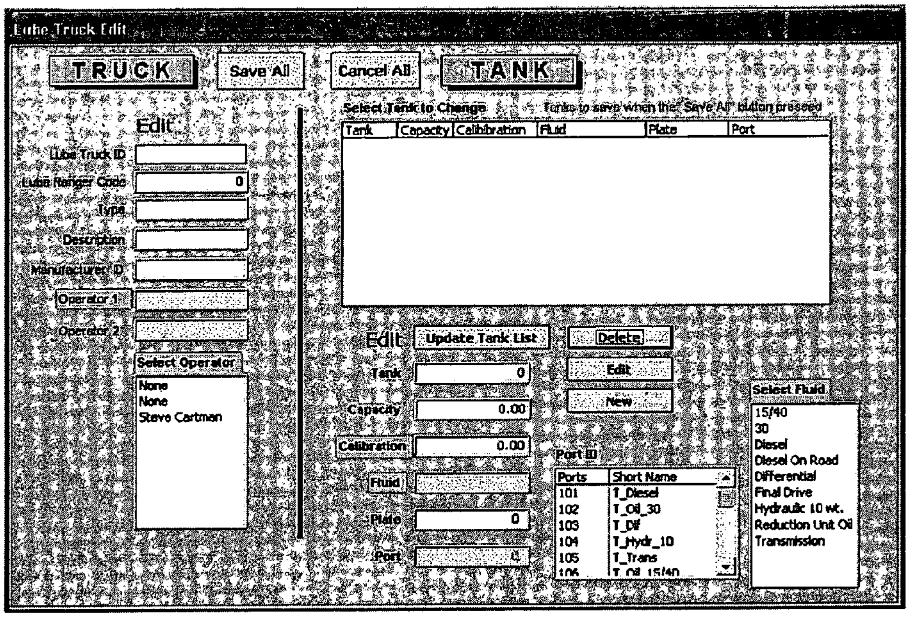

Clicking on an item in the "LubeTruck List" form causes the "LubeTruck Edit" form (FIG. 26) to open. One then fills in the following fields on the form:

Lube truck ID: The Lube truck identification code.

Lube ranger code: Each lube truck has a unique LubeRanger ID between 1-254. The equipment manager enters this ID. A dongle with this ID has to be inserted into the lube truck operator panel. To change the Lube Ranger Code ID, the entire lube truck has to be deleted from the database and entered as a new one.

Type: Optional description of the type of lube truck.

Description: Optional description of the lube truc.

Manufacturer ID: Manufacturer's ID of the lube truck.

Operator 1: Double click on the operator name from the "Select Operator" list box to assign that operator to this truck.

Operator 2: Double click on the operator name from the "Select Operator" list box to assign that operator to this truck.

Note: The operator can be left unassigned to the lube truck by selecting "None" from the operator list box.

To add a new tank, one clicks on "New" on the "LubeTruck Edit" form and fills in the following fields:

Tank: Tank number. Tank numbers can be from 1 to 8.

Capacity: The tank capacity in gallons.

Calibration: Fine calibration adjustment coefficient (−10.00% . . . +10.00%).

Fluid: Double click on the fluid in the "Select Fluid" list box to select it and assign it to the tank.

Plate: When the lube truck port does not yet have an ID plate assigned to it, leave it "0". The ID can be assigned to the port in the lube truck.

Port: Double click on ID in the "Port Type ID" list box to select it.

Click "Update Tank List" to add the tank to the lube truck. This just updates the list. It does not update the database.

To change an existing tank, the manager selects the tank on the "Lube Truck Edit" form (FIG. 24) and clicks "Edit", or double clicks on the selected tank. To change desired tank properties he clicks "Update Tank List". This just updates the list. It does not update the database. He must repeat steps 1 . . . 4 until all desired tanks are updated.

To delete a tank one selects the tank on the "Lube Truck Edit" form and clicks "Delete".

To change an existing Lube Truck the manager selects the lube truck on the "Lube Truck List" form, clicks "Edit", or double clicks on the selected lube truck, to open the "Lube Truck Edit" form and change the lube truck properties.

To save Lube Truck and tank changes one click "Save All" to confirm the changes to the lube truck on the "Lube Truck Edit" form and return to the "Lube Truck List" form. Pressing "Cancel All" returns the screen to the "Lube Truck List" form without saving any changes.

To delete an existing Lube Truck, the manager selects the truck on the "Lube Truck List" form an clicks "Delete".

Clicking "Exit" on the "Lube Truck List" form returns the screen to the "Main Menu".

6. Equipment

Figure 27:
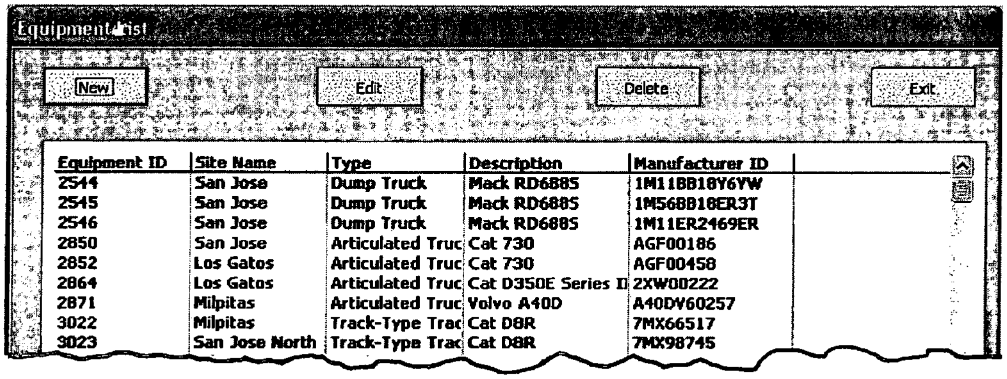

To edit the list of work equipment intended to receive the fluids from the lube truck one opens the Equipment List by clicking on '6. Equipment' on the "Main Menu" (FIG. 27).

Figure 28:
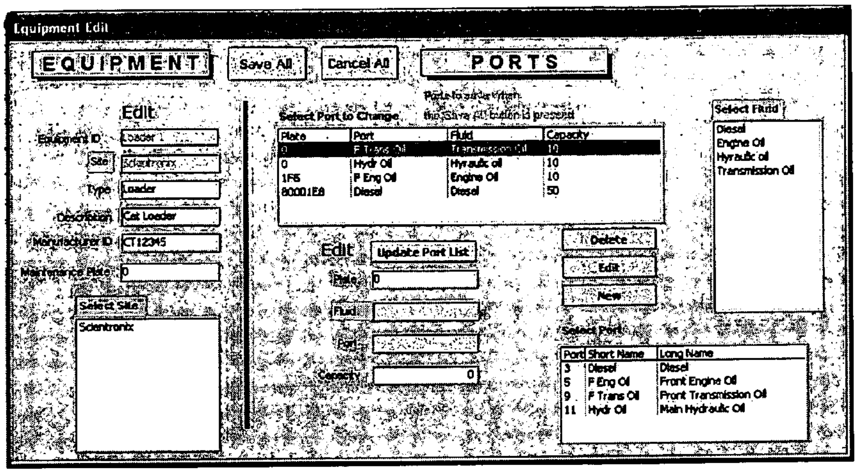

To add new equipment click "New" on the "Equipment List" form to open the "Equipment Edit" form. (FIG. 28) and fill in the following fields:

Lube truck ID: Lube truck identification code.

Equipment ID: Equipment identification code.

Site: Double click on a site on the "Select Site" list box to select site where the equipment is currently located.

Type: Optional description of the type of equipment.

Description: Optional description of the equipment.

Manufacturer ID: Manufacturer's ID of the equipment.

Maintenance plate: Maintenance plate ID. This can be left blank to be assigned by the lube truck operator when it is read for the first time.

To add a new port, click "New" on the "Equipment Edit" form to enter new data by filling in the following fields:

Plate: When defining a new port on a piece of equipment it will not have a plate ID, so leave it '0'.

Fluid: Double click on a fluid on the "Fluid list" box to select the fluid and assign it to the port.

Port type: Double click on a port type on the "Port Type ID" list box to select the port type and assign it to the port.

Capacity: Port capacity in gallons

Click "Update Port List" to add the port to the equipment. This just updates the list. It does not update the database.

To change an existing port, select the port on the "Equipment Edit" form and click "Edit", or double click on the selected port. Then change desired port properties and click "Update Port List". This updates the list. It does not update the database. Repeat steps 1 . . . 4 until all desired ports are updated.

To delete a port, select the port on the "Equipment Edit" form and click "Delete". Press "Save All" to add the equipment and its ports and return to the "Equipment List" form. Then press "Save All" to add the lube truck and its tanks to the database and return to the "Equipment List" form. Press "Cancel All" to return to the equipment list form without saving any changes.

To change existing equipment, select the equipment on the "Equipment List" form and click "Edit", or double click on the selected equipment, to open the "Equipment Edit" form. Then change the equipment properties.

To save equipment and port changes, click "Save All" to confirm the changes to the equipment on the "Equipment Edit" form and return to the "Equipment List" form. Press "Cancel All" to return to the "Equipment List" form without saving any changes.

To delete existing equipment, select the lube truck on the "Lube Truck List" form and click "Delete".

Exit to Main Menu by clicking "Exit" on the "Equipment List" form.

7. Maintenance Type

Figure 29:
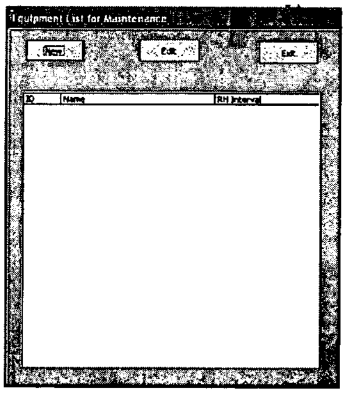
Figure 30:
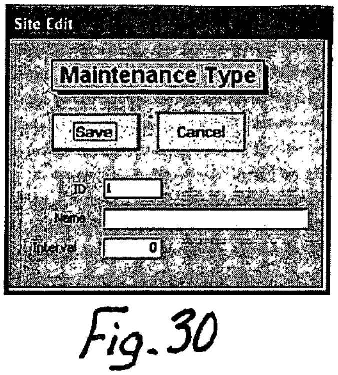

This is a list of different types of maintenance that need to be done at predefined run hour intervals. To open the 'Maintenance Type' list click 'Maintenance Type' on the Main Menu. The 'Maintenance type list' form will open (FIG. 29). Click 'New' to add a maintenance type and open the 'Maintenance type edit' window (FIG. 30). Then fill in the required fields:

ID: Each maintenance type has an id number. Use the first unused number.

Name: The name of the maintenance type.

Interval: The run hour interval between maintenances.

Click 'Edit' to change an existing type. Click 'Delete' to remove a maintenance type.

8. Equipment Maintenance

Figure 31:
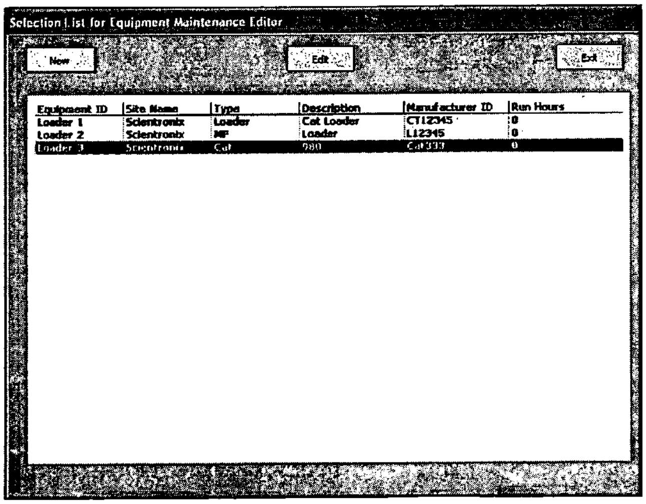
Figure 32:
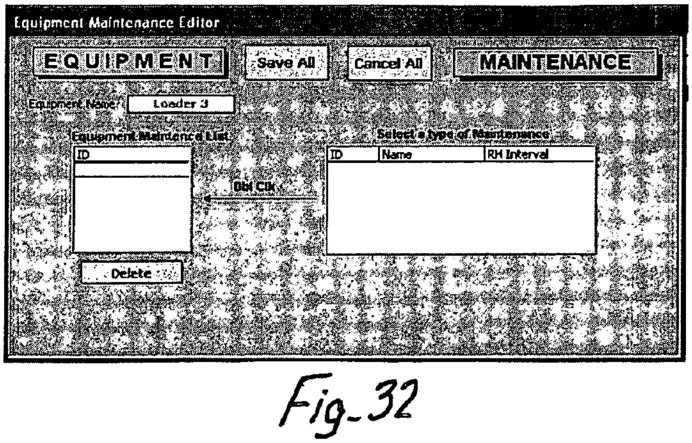

This window is used to define what types of maintenances need to be done to a particular work equipment. Clicking on 'Equip Maint' in the Main Menu causes the Equipment list (FIG. 31) to open. Clicking 'Edit' opens the Equipment Maintenance Editor (FIG. 32) and allows one to edit the maintenance types for the selected equipment. Clicking 'Save All' saves the setting for the given equipment, and clicking 'Cancel All' cancels the changes made and returns the screen to the previous menu.

How the Preventive Maintenance works in LubeRanger

The following is a step-by-step description of how the Preventive Maintenance works.

1. The maintenance types and intervals are set in the database. (7. Maint. Type)
2. Maintenance types for each equipment is defined. (8. Equip maint.)
3. If there are run hour readings received from the equipment, the maintenance due report can be created. If the maintenance intervals are 250 hours and 1000 run hours, then each time a run hour reading reaches 250, 500, 750 etc the maintenance should be done. The maintenance due report shows the hours till next maintenance. 'Maint. History' report shows when the previous maintenance has been done.
4. Maintenance due and maintenance history reports are printed and given to the lube truck operators for reference of upcoming maintenance.
5. The lube truck operators follow the maintenance due report to do the maintenance. Also, the history report should be checked to make sure that no service has been missed. After servicing, the operator reads the maintenance plate on the respective equipment. This creates an acknowledgement event. The 'Maint. History' report in the database shows the maintenance acknowledgement events received from the lube trucks.

9. Job

Figure 33:
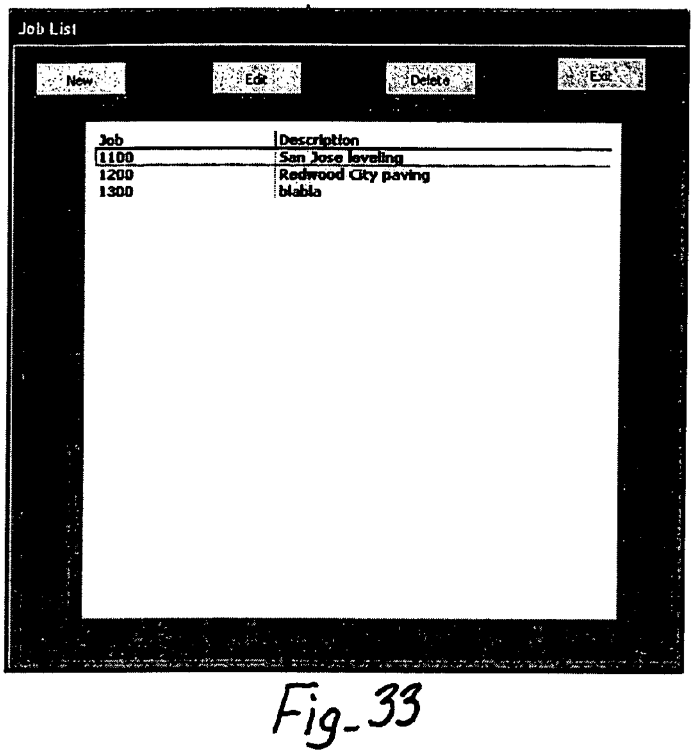

The Jobs created in the database can be to assign unauthorized dispenses where the equipment information is not available. If the equipment does not have an ID plate, then the lube truck operator can dispense the fluid without authorization and assign the dispense to a job afterwards. This is accomplished by clicking "9. Job" on the Main Menu to open the "Job list" form (FIG. 33).

Figure 34:
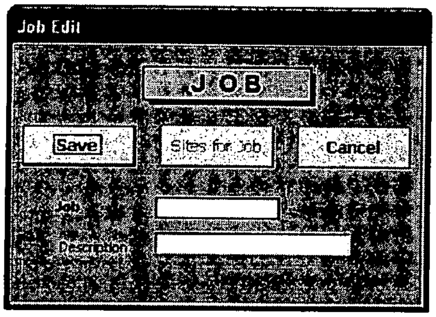

Clicking "New" on the "Job List" form causes the "Job Edit" form (FIG. 34) to open. The operator then fills in the following fields on the "Job Edit" form:

Job: Job number or code.

Description: Name or description.

Figure 35:
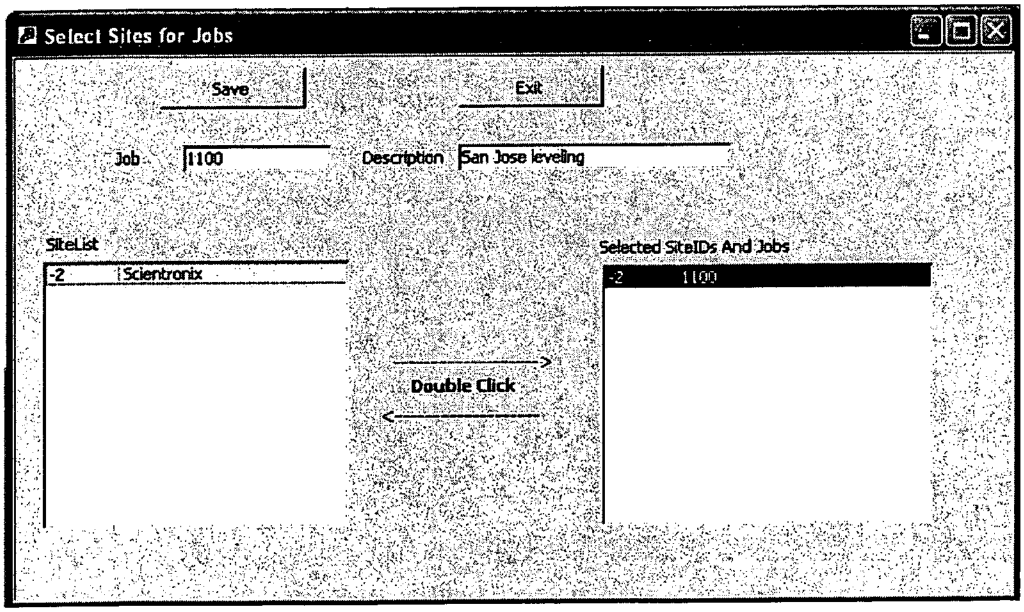

He then clicks "Save" to store the data in the fields, and clicks "Sites for Job" to assign the job to a site(s). The "Select Sites for Job" form opens (FIG. 35) and the operator double-clicks on a site in the Site List. Alternatively, he can double-click on a site in the Selected Site and job to de-select the site.

To change an existing job, he can select the job on the "Job list" form (FIG. 33), click "Edit", or double click on the selected job, to open the "Job Edit" form, and then change the desired properties. Clicking "Save" on the "Job edit" form closes the file.

To delete an existing fluid, he selects job on the "Job List" form, and clicks on "Delete" to remove the selected job.

Clicking "Exit" on the "Job List" form returns the screen to the "Main Menu".

Work Order

The work order is created by the manager on the office PC and sent to the memory sticks each day for delivery to the lube trucks. All of the site and equipment information in the system is sent to each lube truck allowing any truck to be dispatched or re-routed to any site.

Figure 36:
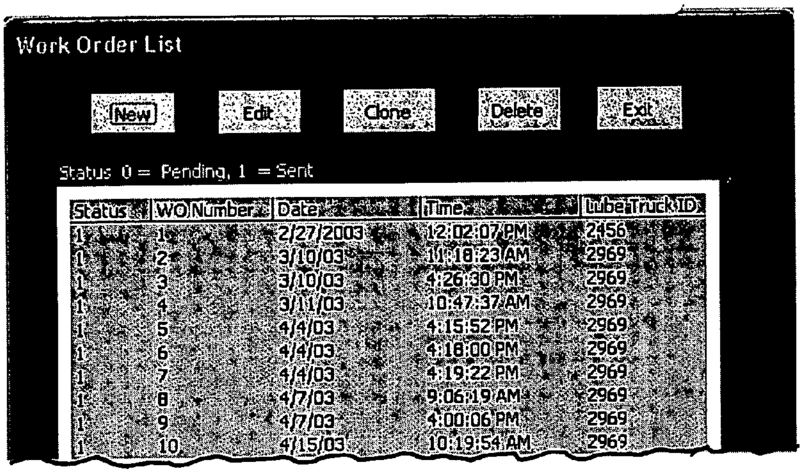

To create a Work Order the manager opens the Work Order List (FIG. 36) and clicks "Create/Edit" on the "Main Menu" to open the "Work Order List" form.

Figure 37:
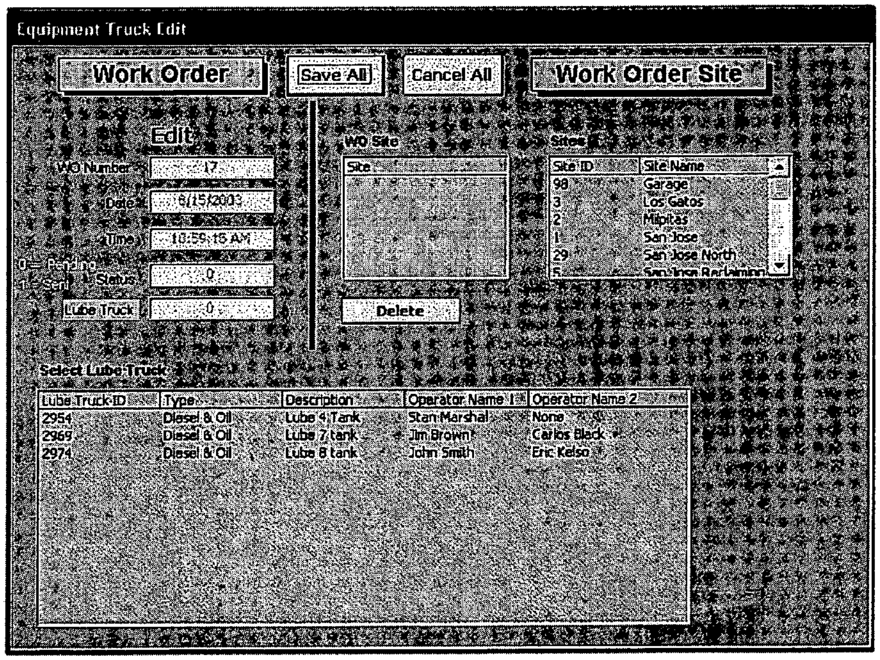

To create a new work order, the manager clicks "New" on the "Work Order List" form to open the "Work Order Edit" form (FIG. 37).

To select a particular Lube Truck and Site, he double clicks on the desired lube truck in the "Select Lube Truck" box. To select sites that have to be serviced by the lube truck, he double clicks on the site names in the "Site List" box. More than one site can be selected. He then clicks "Save All" to save the work order and exit to the "Work Order List" form, or clicks "Cancel All" to return to the "Work Order List" form without saving.

"Clone" is used if there is a need to make a new work order that is similar to an existing one. This is a quick way of creating a new work order for a lube truck that has to repeatedly return to the same site(s). This is done by selecting equipment on the "Work Order List" form, clicking "Clone", or "Edit", on the selected work order to open the "Work Order Edit" form, changing the sites or lube truck ID on the work order, and pressing "Save All" to save the work order and return to the "Work Order List" form.

To delete an existing work order, the manager must select a work order on the "Work Order List" form, and then click "Delete".

To exit to Main Menu click "Exit" on the "Work Order" form to return to "Main Menu".

Send Work Order

Figure 38:
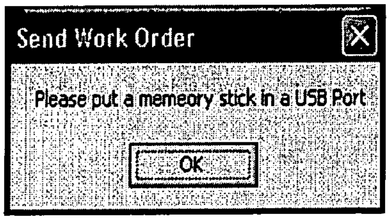
Figure 39:
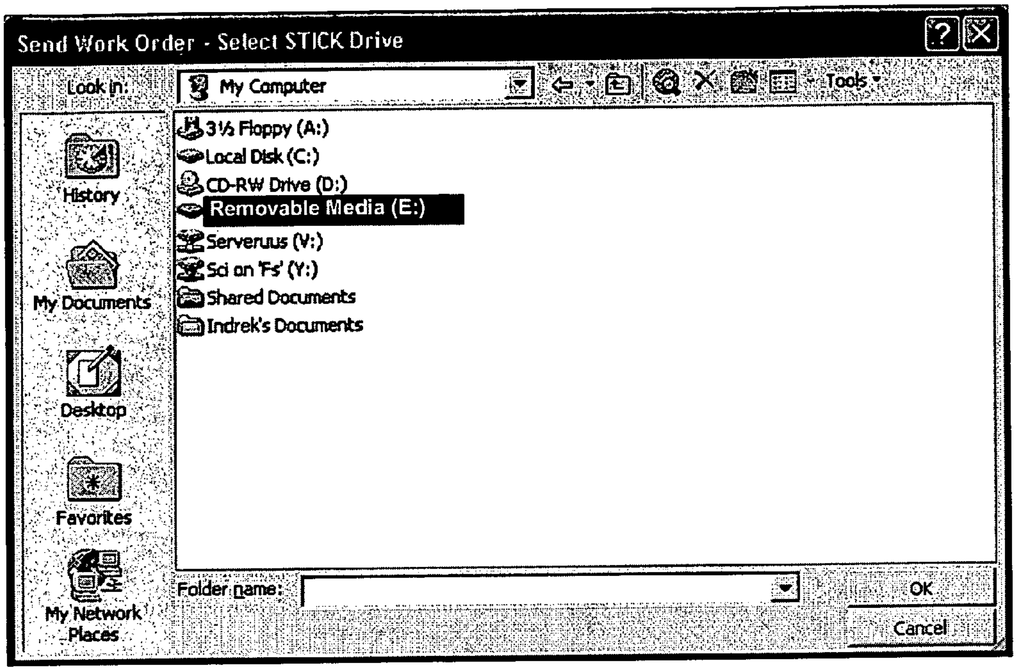

To send a work order to a lube truck, the manager connects the memory stick to the office computer's USB port and clicks "Send" on the "Main Menu" to open the "Send Work Order" dialog box (FIG. 38). He then clicks "OK" to open the "Send Work Order—Select Stick Drive" form (FIG. 39). On this form he selects "My Computer" to open the drives list. He then selects the "Removable Media"

Figure 40:
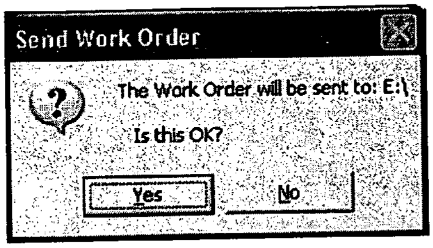
Figure 41:
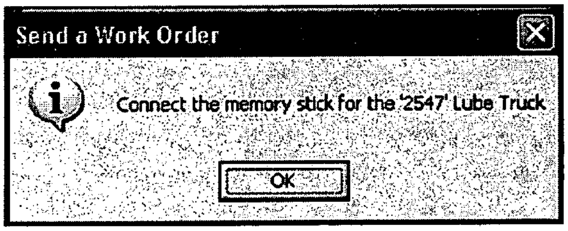
Figure 42:
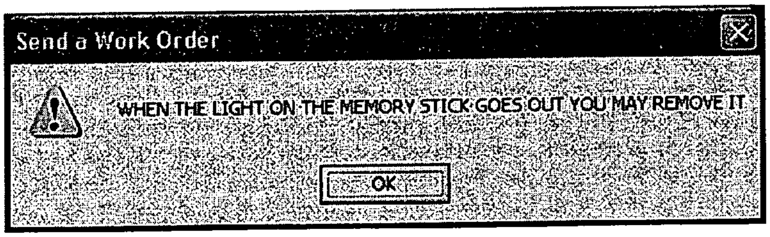

(stick) drive. No files will show, and he clicks "OK". A confirmation dialog window then opens (FIG. 40). He clicks "Yes" to confirm the sending and a second confirmation dialog window opens (FIG. 41). He again clicks "OK" and a "Send" dialog box opens (FIG. 42). He again clicks "OK"and removes the stick when the indicator light on the memory stick goes out. The stick must not be removed while the light on the stick is ON or blinking.

Lube Event

Lube events are stored in the memory sticks in the lube trucks and received from the memory sticks by the office PC.

Figure 43:
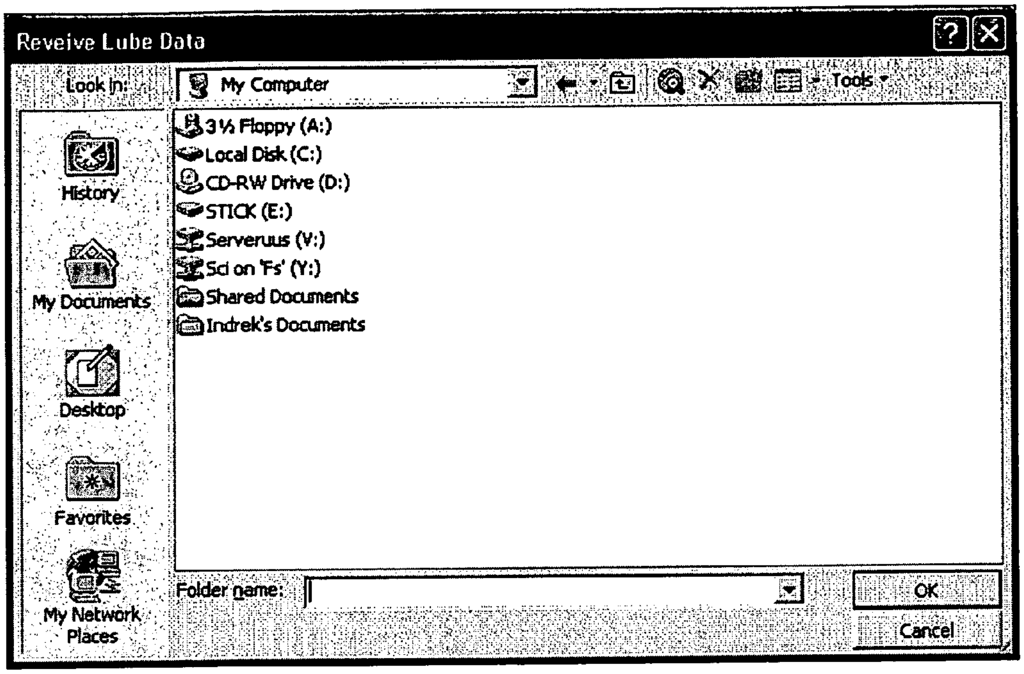

For the office PC to receive the events data, the memory stick must be brought from the lube truck an inserted into the USB port on the office PC The manager clicks "Receive" on the "Main Menu", and clicks "OK" when the memory stick is inserted, and the "Receive Lube Data" form opens. (FIG. 43). He then selects the memory stick drive and clicks "OK".

Figure 44:
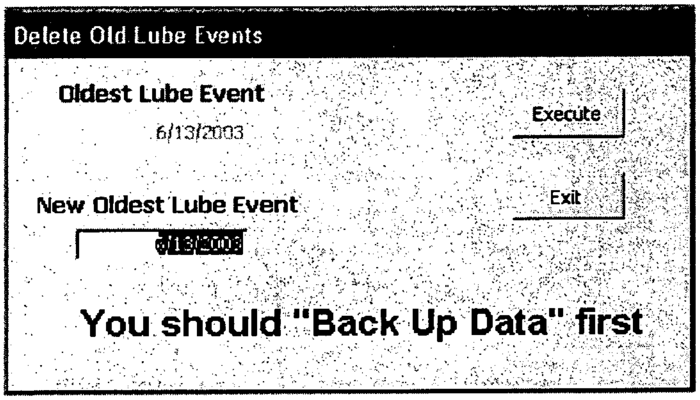

To delete old events, he clicks "Delete Old Events" on the "Main Menu" (FIG. 17). The "Delete Old Lube Events" form opens. (FIG. 44). He then types in the date of the oldest event that he wishes to keep, clicks "Execute" to delete all events up to the date entered, and click "Exit" to return to "Main Menu".

NB! Reports are available only up to the oldest event!

Figure 45:
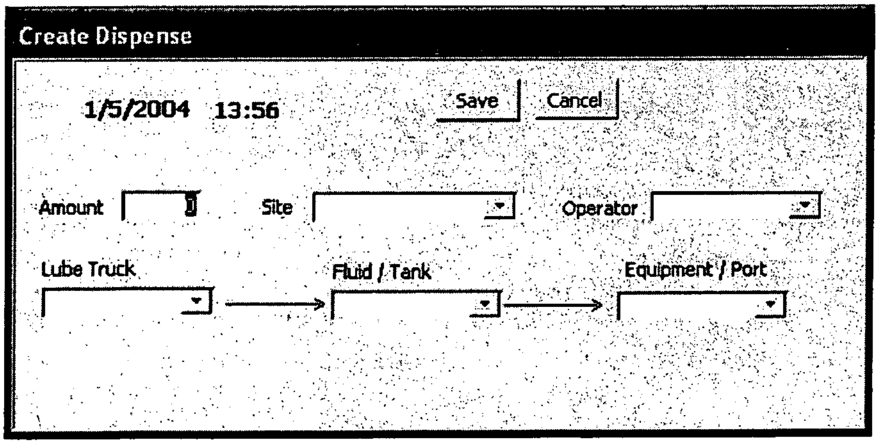

To create a dispense event manually, the manager presses the 'Create Dispense' button on the Main Menu to open the "Create Dispense" window (FIG. 45). He then fills in the fields and clicks 'Save' to create the dispense. He can also click 'Cancel' if he doesn't want to create the dispense. This option is needed if a dispense was done, but was not logged by the system.

Archive

Figure 46:
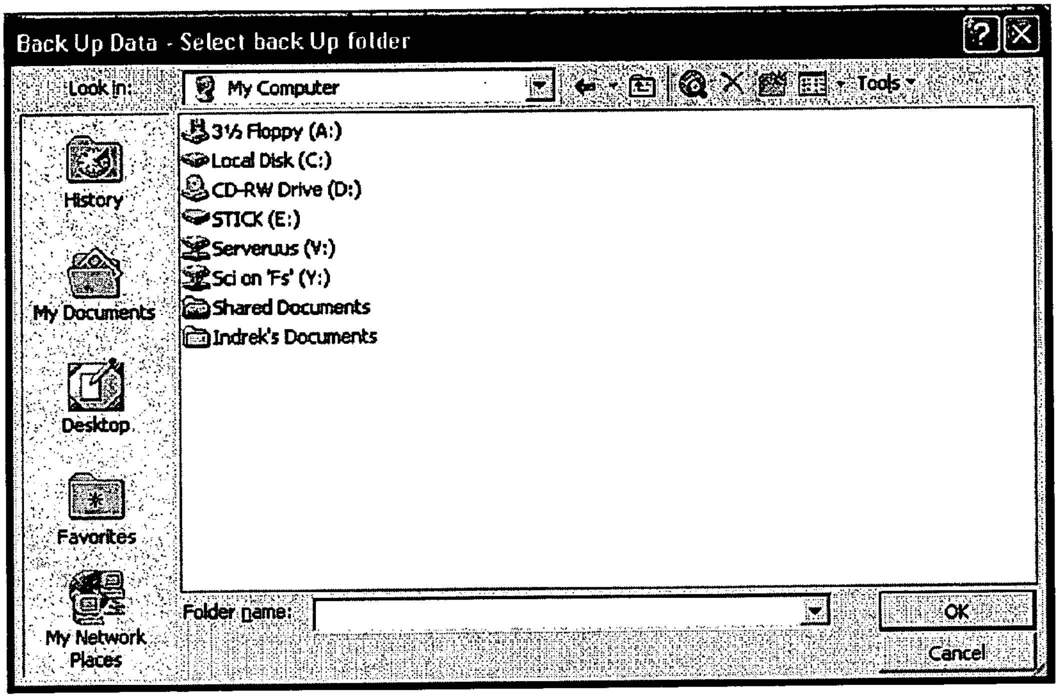
Figure 47:
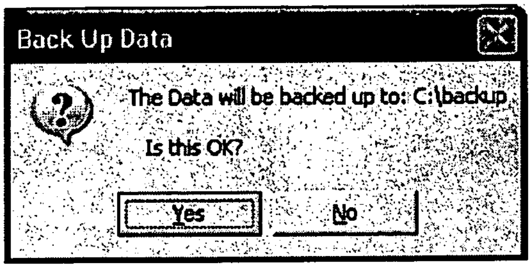

The database should be backed up on a regular basis. The backed up database should be stored in both the PC and in the removable storage device (memory stick). To perform a backup, the manager clicks "Back Up Data" on the "Main Menu" and the "Select back Up Folder" form opens (FIG. 46). He then selects the folder in which to save the backup, clicks "OK", and the "Back up Data" screen opens (FIG. 47). Clicking "Yes" causes the backup process to commence.

Data may also be restored. It is important that the correct folder be used to restore the data because the basic management data is replaced with the data in the archived folder. Data is restored when previously backed up data has to be used for database or reporting. Before using the Restore Data function a Backup of the current database data should be made, otherwise current data in the database will be lost!

Figure 48:
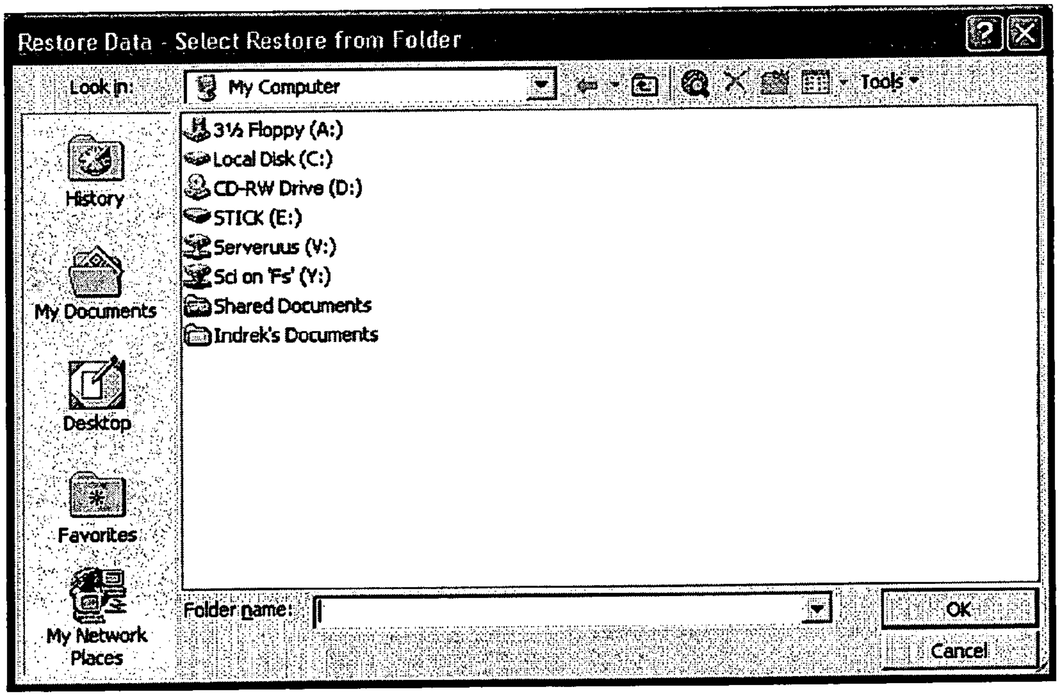
Figure 49:
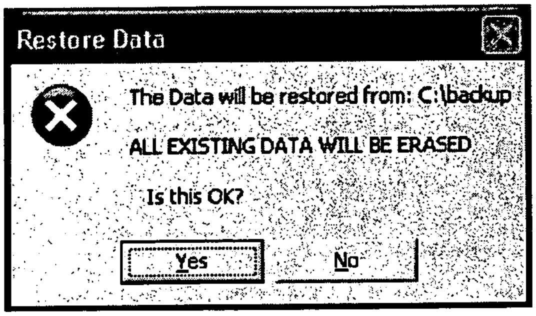

Clicking "Restore Data" on the "Main Menu" causes the "Select Restore from Folder" form to open (FIG. 48). The folder from which to restore data is selected, and clicking "OK" causes a confirming dialog window to open (FIG. 49). If YES is selected, the entire database will be deleted and overwritten with restored data. Current data in the database will be lost!

User access

The LubeRanger database works in two modes; "User" and "Administrator". In User mode the database can not be edited, but the reports can be viewed. Using the administrator password, the manager can switch to the Administrator mode and the database can be edited.

User mode—The LubeRanger database is in user mode by default. User mode means that the database can not be changed or restored, but the data can be viewed and backed up.

Figure 50:
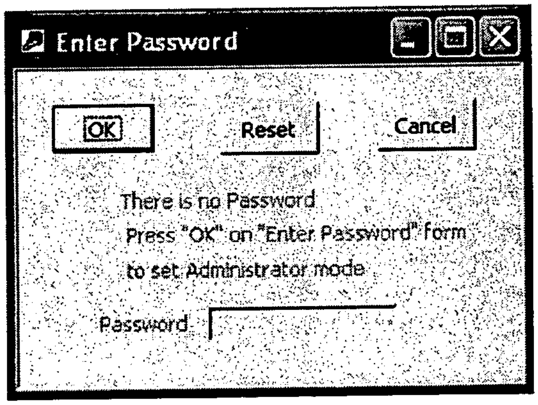
Figure 51:
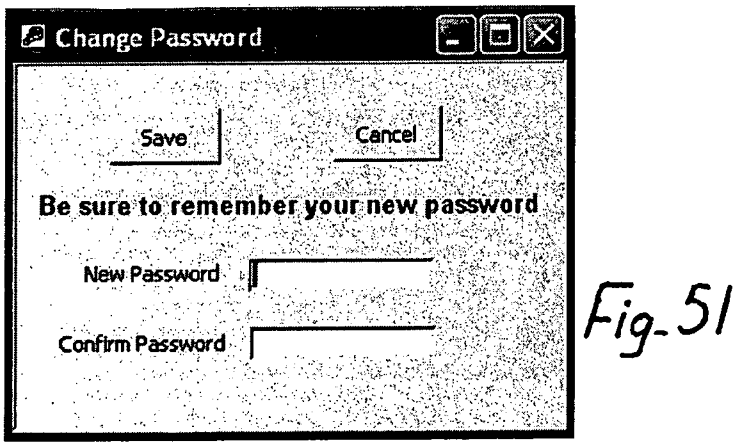

Administrator mode—this mode gives full access to the administrator to change data, restore and delete. To change to administrator mode, one has to enter the administrator password. To switch to Administrator mode, one must click 'Enter Password' on the Main Menu. If there is no administrator password set, the "Enter Password" window (FIG. 50) appears. If the password is set, then it must be entered in the field, in which case pressing 'OK' causes a switch to Administrator mode. To change the administrator password, and have the "Change Password" window (FIG. 51) open, the application must be in administrator mode, and 'Change Password' must be clicked on the Main Menu. The password is changed by entering the new password twice and then clicking 'Save'.

Reports

This selection on the Main Menu produces documents that can be used to analyze what is happening in the field. Reports tie together the basic data (lube trucks, sites, fluids etc) with the lube events (dispenses, run hours, etc).

Figure 52:
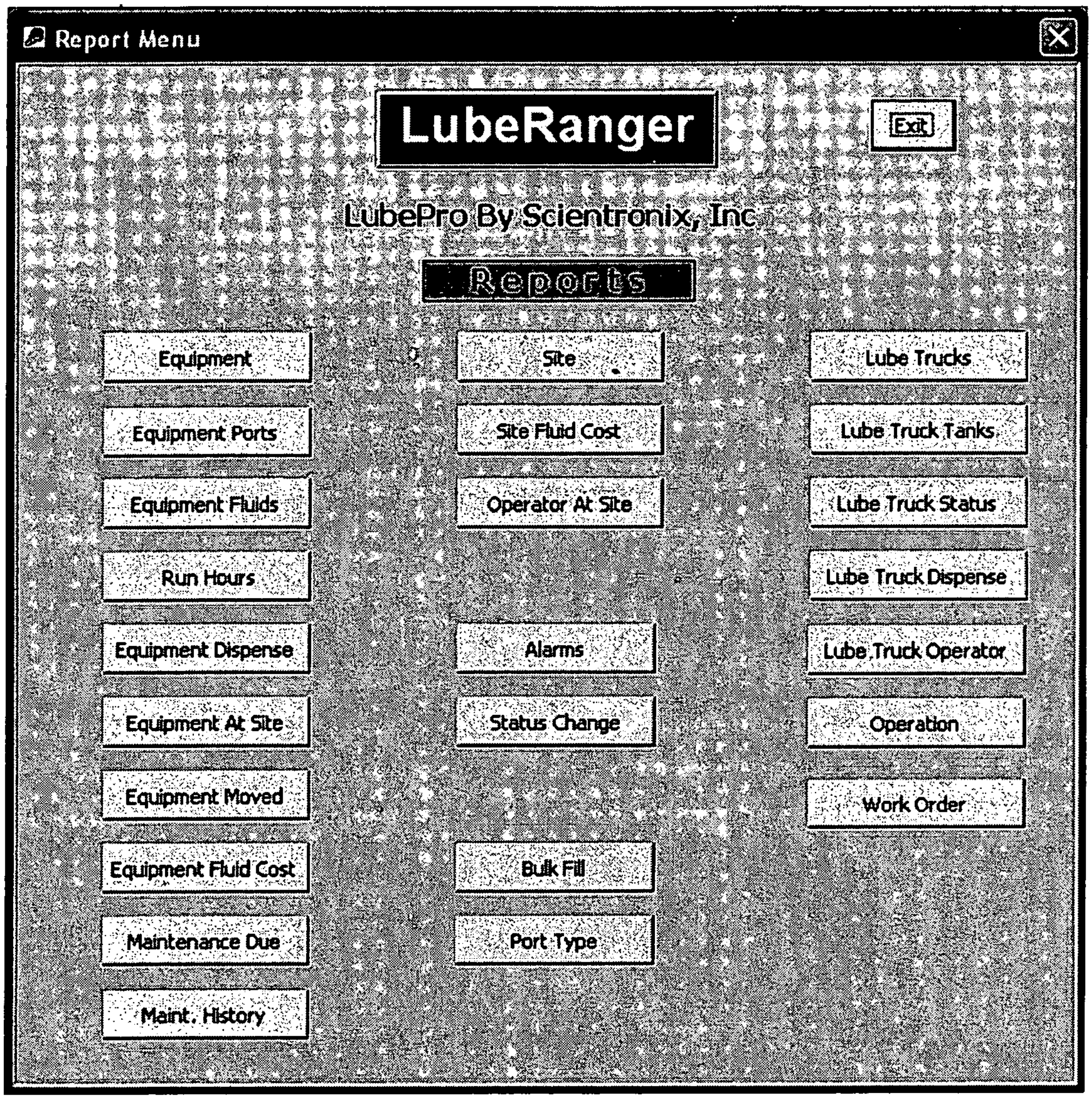

Clicking "Reports" on the "Main Menu" (FIG. 17) causes "Report Menu" form (FIG. 52) to open. To create a report the manager clicks on the name button that identifies the report to be run. In response, a report form opens, and upon filling the required fields and clicking "Report" the report will be displayed on the screen.

If the report is displayed on the screen, it can be printed by simply clicking "Print" on the "File" menu in the top left corner of the Windows desktop. The following is a brief list of the reports that are available:

Equipment Reports

Equipment

List of all available work equipment with main properties.

Columns: Equipment ID, Type, Site Name, Description, Manufacturer ID.

Equipment Ports

Information about selected equipment ports.

Selection: Select the equipment from list.

Header: Equipment ID.

Columns: Port ID, Plate ID, Fluid name, Capacity, RH filter.

Fluids

List of all fluids with properties.

Columns: ID, Fluid Name, Price.

Run Hours

Period run hours of selected equipment.

Selection: Select the equipment from list and then select dates.

Header: Equipment ID, Interval RH, Ending RH, Start date, End date

Columns: Port, Fluid Name, Units, Amount Per Run Hour, Times Dispensed,

Amount Dispensed.

Equipment Dispense

Information of all dispenses of all equipment.

Selection: Select start date.

Columns: Date; Equipment ID; Lube Truck ID; Amount; Time; Site.

Equipment at Site

List of service sites and equipment on it.

Columns: Site, Equipment ID, Type, Description, Manufacturer ID.

Equipment Moved

List of equipment moved during selected period.

Selection: Start date

Header: Start date

Columns: Equipment ID, Date, Longitude, Latitude, Site

Equipment Fluid Cost by Site

The cost of fluid per equipment at selected site.

Selection: Start Date; End Date; Site

Header: Start Date; End Date; Site

Columns: Equipment ID; Interval RH; Fluid; Amount; Cost $

Maintenance Due

The equipment maintenance due.

Selection: Run Hours due; Site

Header: Run Hours Trigger, Site

Columns Equipment ID, Run Hours, Run Hours due, Interval, name

Maintenance History

Equipment maintenance history.

Selection: Equipment

Header: Equipment ID

Columns: Date; Time; Run Hours

Site Reports

Site

List of all sites with properties.

Header: Site name, Site ID, Latitude, Longitude, Radius.

Site Fluid Cost

Selection Site, Start date, End date

Header: Site, Start date, End date

Columns: Fluid ID, Fluid Name, Unit, number of Dispenses, Amount Dispensed,

Price, Cost, Total cost.

Operator at Site

Information of sites serviced by operators.

Selection: Operator, Start date, End date

Header: Operator, Start date, End date

Columns: Date, Site.

Special Event Reports

Alarms

List of alarms on selected period.

Selection: Start date

Header: date

Columns: Status, Date, Time, Lube Truck, Plate ID, Fluid, Equipment ID, Handheld ID, Amount, Tank #, Latitude, Longitude, Site.

Status Change

List of status change events.

Selection: Start date

Header: Start date

Columns: Code, Equipment, Port Name, Plate ID, Latitude, Longitude, Site

Port Types

List of all port types with properties.

Columns: Port Type ID, Long Name, Short Name.

Lube Truck

Lube Trucks

List of all lube trucks with properties

Columns: Truck ID, Type, Description, Manufacturers ID, Operator 1, Operator 2

Lube Truck Ports

Information about selected lube truck ports.

Header: Truck ID, Type, Description, Manufacturers ID, Operator 1, Operator 2

Columns: Tank ID, Capacity, Calibration, Fluid name.

Lube Truck Status

Logged lube trucks' status information.

Selection: Start date

Header: Start date

Columns: Lube Truck ID, Status, Date, Time, Handheld ID, Equipment, Latitude, Longitude, Site ID.

Lube Truck Dispense

List of dispenses from the selected lube truck.

Selection: Lube Truck, Start date, End date

Header: Lube Truck, Start date, End date

Columns: Tank ID, Name, Unit, Dispensed Amount, Number of Dispenses.

Operator

Logged information about operators.

Selection: Start date

Header: Start date

Columns: Lube Truck ID, Status, Date, Handheld ID, Equipment ID, Latitude, Longitude, Site ID.

Operation

Limited Lube trucks' Status Report.

Columns: Operator Name, Handheld ID, Operator ID, Lube Truck.

Bulk Dispense

Tank Fill

Daily Routine

Operation of this embodiment of the subject invention may be understood from the following typical example of the daily routine followed by a lube truck operator after he arrives at the system office, picks up a memory stick, and goes to his lube truck.

Figure 53:
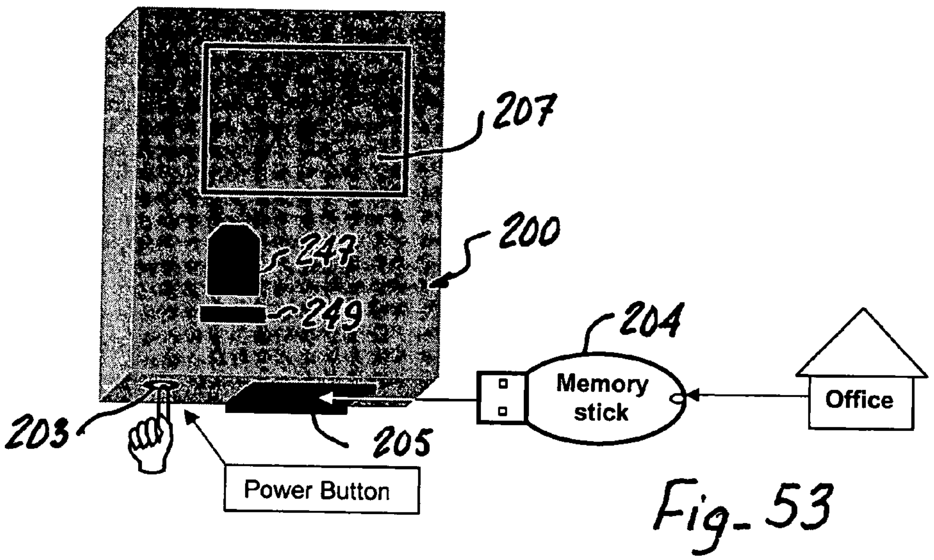

Upon entering the truck cab he inserts the memory stick into the operator panel stick port 205 (FIG. 53), presses the power button 203 on the operator panel sidewall and turns on the ignition key 224 (FIG. 8) to initialize the system. If the operator panel is in its OFF state, the initialization takes about 4 . minutes to complete. If the operator panel is in the SLEEP Mode, the panel is ready for use almost instantaneously when the ignition is engaged. If the operator panel is in the ON, or SLEEP, mode and the truck's ignition is OFF for at least one hour, and there is no activity on the LubeRanger™ system, the operator panel 200 will enter the OFF state automatically.

Figure 54:
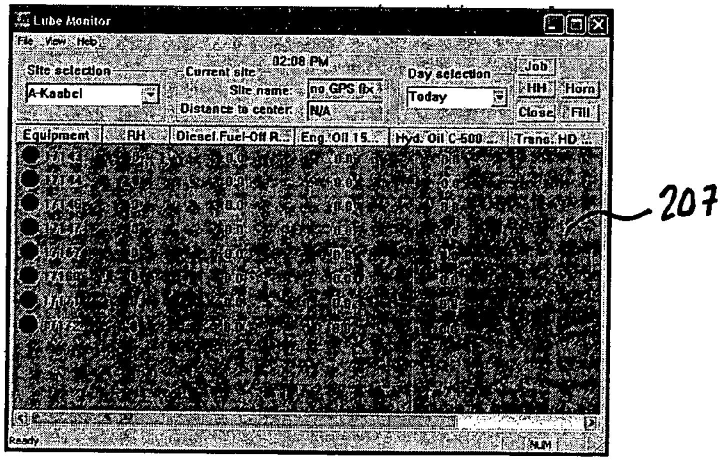
Figure 55:
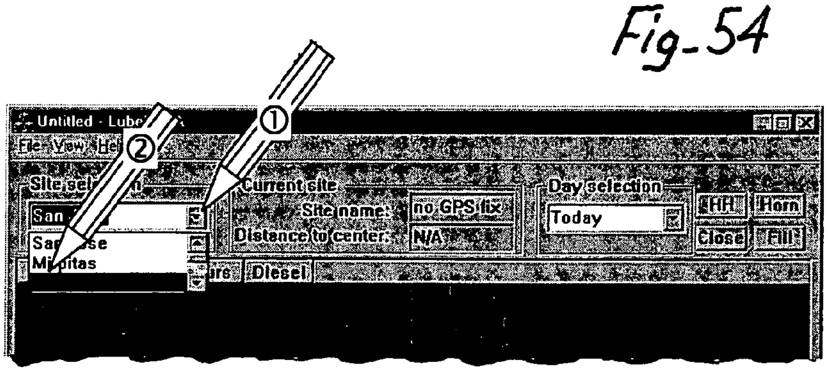

On startup, the Home Screen 207 (as illustrated in FIG. 54) will appear. The operator will read his assignments and proceed to the first site on his assignment list.

When the system is started and the LubeMonitor window 207 is as displayed in FIG. 54 there may be a black, yellow or green dot in front of each equipment line. If the dot is black it means that the equipment identified on that line has not yet been serviced during the current date. If there is no dot, this indicates that the equipment has been serviced. If there is a yellow dot with an M, it means that the maintenance plate for the respective equipment has been read. If there is a green dot, this means that the respective equipment has been serviced and moved from one site to another.

As an aid to the operator, the LubeRanger™ constantly tries to determine the current site of the equipment listed on the work list screen according to the GPS coordinates. Status information on the current site is displayed in the 'Current site' box on screen 207. If the "Site Name" box displays a site name then the lube truck is within that site's range and the distance to that site's center is displayed in the 'Distance to center' box. If the "Site name" box displays the text 'no GPS fix', no Global Positioning System fix has been acquired. In that case the LubeRanger™ can't determine the lube truck's current position. If the "Site Name" box displays the text 'no Site', a Global Positioning System fix has been acquired and the LubeRanger™ can determine the current position but the lube truck is not within a defined site range.

If the current site is not determined automatically, then the site has to be selected manually as follows:

Under "Site selection" (FIG. 54), open the site selection combo box and press the down arrow until the desired site name appears on the drop down menu. The site names are ordered as follows: current work order sites for the lube truck are at the top of the list above a separating line; the other sites are listed below. If the desired site name is not visible, scroll the list up or down until the site is found.

Figure 56:
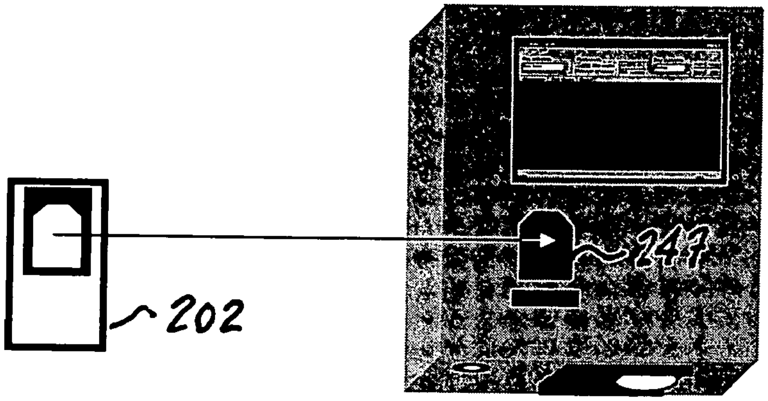

At this point the operator places the handheld unit on the operator panel start plates 247,249 as suggested in FIG. 56 and waits for 3 sound and light signals indicating that the handheld unit has been "awakened" and is ready for use. If the unit is not used it will go back to its SLEEP mode after 10 minutes of inactivity. Sound and light signals indicate that the LubeRanger™ system is working. He then removes the hand held unit from the panel and gets ready to dispense.

If the dispense is to be made at a fueling station and the equipment operator needs to be identified, then the operator's personal ID plate has to be read prior to dispense. In doing so, the operator's hand held unit is positioned over his ID plate and he waits for an "ack" signal from the horn 232 and flashing lamp 230 (FIG. 8). He then follows the lube truck dispense steps described below.

Figure 57:
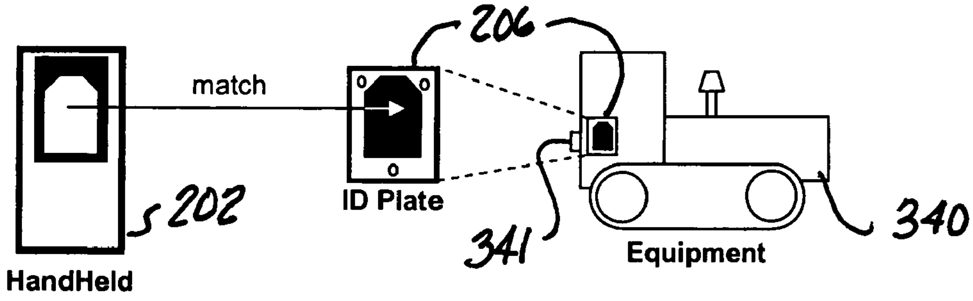

To make a lube truck dispense to a piece of work equipment 340 (FIG. 57), the operator will place his hand held unit 202 on the equipment ID plate 206 that is positioned near the port 341 of an equipment to be serviced. The hand held unit will read the port information encoded in ID plate 206 and transmit the information to the lube truck. If the operator panel determines that the received information corresponds to the port intended to be serviced, the truck will generate a sound and light signal signifying authorization to dispense. Upon hearing or seeing the acknowledgement signal, the operator will remove his handheld unit and start dispensing to the selected port within 10 seconds. An alarm signal will sound if an incorrect type of fluid is dispensed or if the dispense is started longer than 10 seconds after the dispense was authorized. The system will generate 3 . short sound signals if no dispense is started after 10 seconds, and the request without flow will be registered. If the dispense is normal, after finishing the dispense, the operator will wait for a double sound and light signal indicating the end of the dispense and that the dispense data has been transmitted to the operator panel in the lube truck and written into the LubeRanger™ system. To continue dispensing after the double signal, a new dispense must be authorized.

Figure 58:
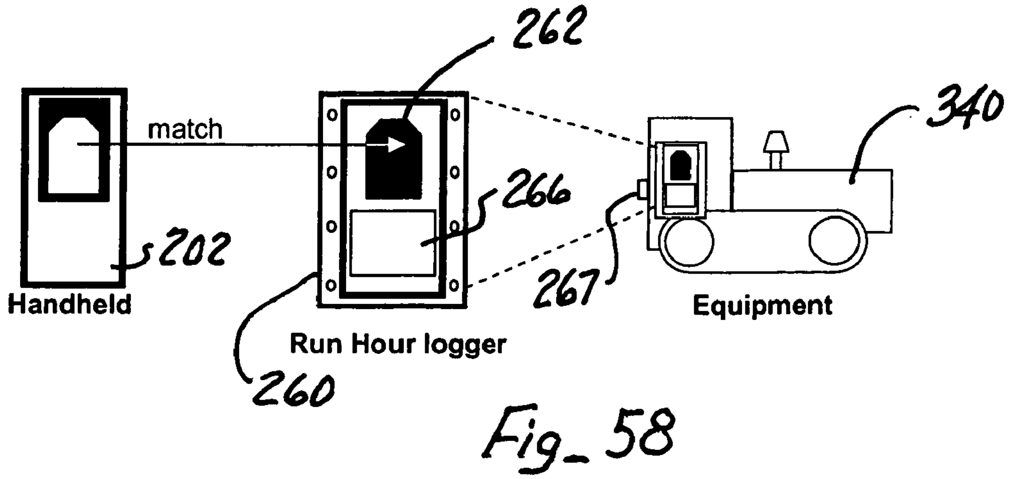

The system also permits independent use for the purposes of run hours reading, dispense authorization or preventive maintenance acknowledgement. In the case illustrated in FIG. 58 where the run hour logger unit 260 is positioned proximate to a fill port 267 and the ID plate 262 is encoded accordingly, it is not necessary that the hand held unit be awakened by the operator panel because as explained above, the logger unit is capable of generating its own wake up signal when the unit 202 is mated to it. So in this case, in order to wake up the hand held unit 202, it is placed on the run hour logger ID plate 262 that is positioned near the port 267 of the equipment 340 to be serviced, and in response the logger wakes up the unit 202 and allows it to read port information or run hour values and transmit such information to the lube truck. The operator then waits for a light and sound signal indicating that the equipment port data and run hours have been read into the operator panel, and dispense is authorized or maintenance is acknowledged. If a dispense is called for the operator must start dispensing within 10 seconds. An alarm signal will be sounded if a wrong type of fluid is dispensed or if dispense is started longer than 10 seconds after the dispense was authorized.

After finishing the dispense, the operator will wait for a double sound and light signal that indicates the end of dispense and that the dispense data has been written into the system. To continue dispensing after double signal, a new dispense authorization must be obtained or an error signal will be recorded.

Preventive maintenance acknowledgement is done the same way as dispense authorization. When the maintenance is performed, the ID plate assigned as the maintenance plate for the equipment is read to acknowledge the maintenance.

Figure 59:
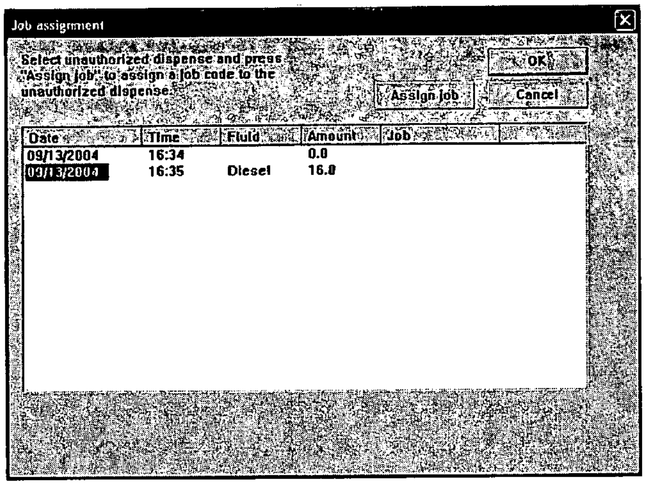
Figure 60:
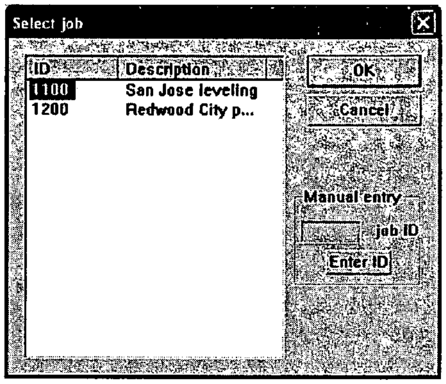

When a dispense is made, but the equipment can not be identified (id plate missing etc), a job number can be assigned to the dispense. In this case the job number is shown on reports instead of the equipment information. To assign a job number to a dispense the operator dispense fluid without authorization, return to the cab and click on the "Job" button on the LubeMon screen. This will cause a "Job Assignment" screen to open as illustrated in FIG. 59. The operator will select a dispense from the list of unauthorized dispenses and click "Assign job" and cause the "Select Job" screen of FIG. 60 to open. He will then select a job from the list or enter the job number in the manual entry window and click OK twice.

Before leaving a particular work site the operator will check the panel screen for equipment that has not been serviced. Such equipment will be marked on the screen with a black dot. He will also check the serviced ports for flow readings per equipment on the screen. Un-serviced ports will have 0 dispensed amounts. Displayed fluid amounts are day totals for the equipment port (all dispenses to one equipment port are summarized for each day); the run hour value is the latest reading for that equipment. The truck may now return to the office.

Figure 61:
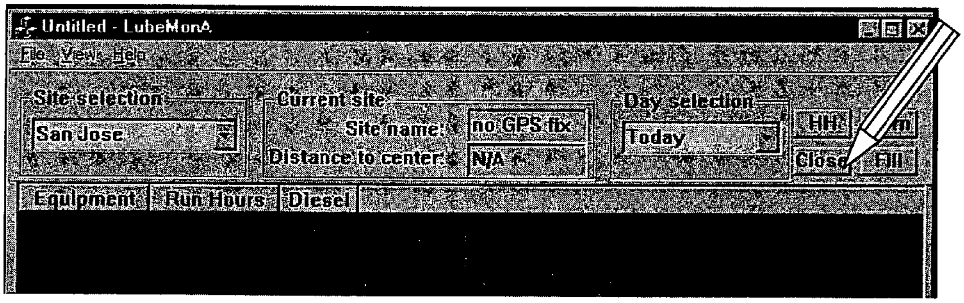

In order to move the days' event data to the office, the operator panel must be in the OFF mode before removal of the memory stick! If the operator panel is in the OFF mode the memory stick may be removed. Otherwise the operator panel must be shut down by pushing the "Close" button on the operator panel screen as shown in FIG. 61.

Figure 62:
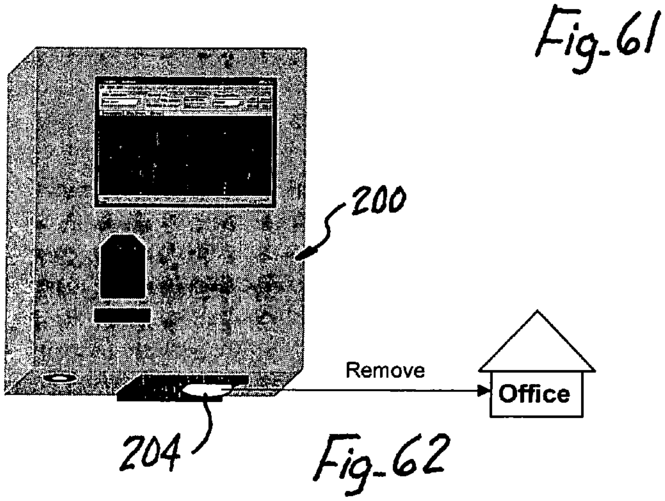

This command shuts the system off after 30 seconds. The memory stick can now be removed from the operator panel (but only after the system has entered the OFF mode). The memory stick is the carried to the office computer as suggested by FIG. 62 and inserted into the USB port of the office computer. Clicking the "Receive" button under "Lube Event" in the "Main Menu" will upload the event data from the memory stick to the office computer.

While various alternatives have been described above, it should be understood that the present invention has been presented by way of example only, and not limitation. Thus, the breadth and scope of the invention should not be limited by any of the above described exemplary embodiments, but should be defined only in accordance with the following claims.

What is claimed is:

1. A system for passively monitoring distribution of fluid products from a mobile service vehicle to fill ports on work equipment to be serviced, comprising:

(a) a plurality of passive, magnetically encoded indicia means each adapted to be attached a work equipment to be serviced at a point proximate an associated fill port of the work equipment, each said indicia means being magnetically readable to provide a first set of data uniquely associated with the corresponding fill port;

(b) a run time logger including i) a vibration sensor adapted to be attached to the body of a work equipment to be serviced, said sensor being responsive to vibration of said work equipment caused by operation of its engine and operative during the time the engine is running to generate an oscillating electrical signal having a fixed frequency, ii) a microprocessor responsive to said oscillating electrical signal and operative to generate and store a digital run time signal proportional to the number of cycles of said oscillating electrical signal occurring during operation of the engine, and iii) a first pair of capacitive output plates; and iv) a modulator for modulating stored run time signals and coupling the modulated run time signals to said first pair of capacitive output plates;

(c) a reader/transmitter means for reading said magnetically encoded indicia maims to obtain said first set of data, and including a second pair of capacitor plates for capacitively coupling said modulated run time signals from said first pair of capacitive plates and into said reader/transmitter means, said reader/transmitter means being operative to transmit the first set of data and the modulated run time signals;

(d) apparatus for generating a second set of data associated with a fluid product carried by the service vehicle and made ready for distribution to a selected fill port on a work equipment; and (e) an operator panel adapted to be mounted on a service vehicle, said panel including a receiver for receiving the transmitted first set of data and run time signal, logic for comparing said first set of data to said second set of data and for determining whether or not said first set of data identifies a particular fill port intended to be serviced with fluid product associated with said second set of data, and for generating an alarm signal commensurate therewith, and logic for logging the first set of data, the second set of data, the run time signal and the alarm signal.

2. A system for passively monitoring distribution of fluid products from a mobile service vehicle to fill ports on work equipment to be serviced, as recited in claim 1, and further comprising a horn that is actuated by said alarm signal to validate selection of the port as the intended port to be serviced.

3. A system for passively monitoring distribution of fluid products from a mobile service vehicle to fill ports on work equipment to be serviced, as recited in claim 1, wherein said alarm signal is used to sound an alarm warning of any improper distribution of the products.

4. A system and apparatus for passively monitoring distribution of fluid products from distribution sources to fill ports on a work equipment, comprising:

(a) a magnetically encoded port identifying means associated with each fill port on a work equipment to be serviced, said port identifying means containing port data relating to the identity of the work equipment, the identity of the fill port, and the type of material to he dispensed to the fill port;

(b) a run time logger including i) a vibration sensor adapted to be attached to the body of the work equipment to be serviced, said sensor being responsive to vibration of said work equipment caused by operation of its engine and operative during the time the engine is running to generate an oscillating electrical signal having a fixed frequency, ii) a microprocessor responsive to said oscillating electrical signal and operative to generate and store a digital run time signal proportional to the number of cycles of said oscillating electrical signal occurring during operation of the engine;

iii) a first pair of capacitive output plates; and iv) a modulator for modulating stored run time signals and coupling the modulated run time signals to said first pair of capacitive output plates;

(c) a remote receiver associated with the distribution sources of said fluid products; magnetic reader means for reading said port data and including:

i) a second pair of capacitor plates for capacitively, coupling said modulated run time signals from said first pair of capacitive plates and into said reader means, and for transmitting said port data and said modulated run time signals to said remote receiver;

(d) flow monitoring means associated with said remote receiver and the distribution sources and operative to generate flow data indicating a particular distribution source, the type of fluid to be dispensed from said particular distribution source, and the volume of fluid actually dispensed from said particular distribution sources in servicing a fill port;

(e) means associated with said receiver and said flow monitoring means for comparing said port data to said flow data, and operative to generate an alarm in the event that any aspect of said port data is incompatible with any aspect of said flow data; and (f) means for producing a record of said run time signal, said port data, said flow data and the fact that an alarm was generated.

5. An apparatus as recited in claim 4, wherein said port data includes information relating to the type of material to be distributed to a particular fill port.

6. An apparatus as recited in claim 5, wherein said port identifying means includes an array of magnetic indicators respectively polarized and organized so that when inspected, a set of code terms are developed uniquely identifying the work equipment, a particular fill port thereof and the type of material to be distributed to said particular fill port.

7. An apparatus as recited in claim 5, wherein said reader means is further operative to generate operator data identifying the operator responsible for servicing said vehicle and for transmitting said operator data to said remote receiver.

8. An apparatus as recited in claim 4, wherein the flow monitoring means includes a lookup table identifying the type of material to be put into a particular fill port.

9. An apparatus as recited in claim 8, wherein said reader means is further operative to generate operator data identifying the operator responsible for servicing said vehicle and for transmitting said operator data to said remote receiver.

10. An apparatus as recited in claim 4, and further comprising means for determining the location of a work equipment to be serviced and the time of servicing, and for reporting same to said means for producing a record, whereby such location and time of servicing is included in said record.

11. An apparatus as recited in claim 4, wherein said port identifying means includes an array of indicators organized so that when inspected, a set of code terms can be developed uniquely identifying a particular work equipment, a particular fill port of said particular work equipment and the type of material to be distributed to said particular fill port.

12. An apparatus as recited in claim 4, wherein said reader means is further operative to generate operator data identifying the operator responsible for servicing the work equipment, and to transmit said operator data to said remote receiver.

* * * * *